United States Patent [19]
Dieudonne et al.

[11] Patent Number: 5,521,915
[45] Date of Patent: May 28, 1996

[54] SYNCHRONOUS DIGITAL CHANNEL CELL ASSEMBLY AND DISASSEMBLY DEVICE, SYNCHRONOUS DIGITAL CHANNEL SWITCHING CENTER, AND ASYNCHRONOUS DIGITAL CHANNEL SWITCHING CENTER

[75] Inventors: Marc Dieudonne, Igny; Jean-Pierre Glon, Bougival, both of France

[73] Assignee: Alcatel CIT, Paris, France

[21] Appl. No.: 278,279

[22] Filed: Jul. 21, 1994

[51] Int. Cl.[6] .................................................. H04L 12/56
[52] U.S. Cl. .............................. 370/60.1; 370/82; 370/99
[58] Field of Search ........................... 370/58.2, 60, 60.1, 370/82, 85.13, 99

[56] References Cited

U.S. PATENT DOCUMENTS

| | | | |
|---|---|---|---|
| 5,229,992 | 7/1993 | Jurkevich et al. | 370/82 |
| 5,311,509 | 5/1994 | Heddes et al. | 370/82 |
| 5,400,337 | 3/1995 | Munter | 370/60.1 |

FOREIGN PATENT DOCUMENTS

| | | |
|---|---|---|
| 0488399A2 | 6/1992 | European Pat. Off. . |
| 2655794A1 | 6/1991 | France . |
| WO9411975 | 5/1994 | WIPO . |

OTHER PUBLICATIONS

"Evolution of Alcatel Exchanges", *Electrical Communication*, vol. 65, No. 1, 1991, pp. 19–21.
French Search Report FR9300955.

*Primary Examiner*—Benedict V. Safourek
*Attorney, Agent, or Firm*—Sughrue, Mion, Zinn, Macpeak & Seas

[57] ABSTRACT

A cell assembly device switches and assembles synchronous digital channels into asynchronous transfer mode cells supporting asynchronous logical channels. The cells are sent on asynchronous multiplex links, and the synchronous digital channels are conveyed by synchronous multiplex links organized into recurrent frames. Samples of each synchronous digital channel are represented by binary words placed in time slots occupying fixed positions in the frames. The cell assembly device includes: an input memory for storing the samples of all the synchronous digital channels of each frame as the samples are received; cell formation memories which supply cells to the asynchronous multiplex links; a cell identifier memory for storing information for each cell; a marking memory containing a link list containing the information necessary for switching of the synchronous digital channels to the asynchronous logical channels; and a control circuit for transmitting octets from the input memory into one of the cell formation memories, and for transmitting a header from the cell identifier memory into one of the cell formation memories, at write addresses supplied by the cell identifier memory.

10 Claims, 13 Drawing Sheets

SYNCHRONOUS DIGITAL CHANNEL CELL ASSEMBLY AND DISASSEMBLY DEVICE, SYNCHRONOUS DIGITAL CHANNEL SWITCHING CENTER, AND ASYNCHRONOUS DIGITAL CHANNEL SWITCHING CENTER

BACKGROUND OF THE INVENTION

The invention concerns: a synchronous digital channel cell assembly device, a synchronous digital channel cell disassembly device, a synchronous digital channel switching center including cell assembly and disassembly devices of this kind, and an asynchronous digital channel switching center for routing to other switching centers cells produced by a cell assembly device of this kind.

In a synchronous network the digital channels are conveyed by synchronous multiplex links at a bit rate of 2.048 Mbit/s, for example, organized into recurrent frames having a fixed frame period and divided into time slots of fixed duration. A sample of each synchronous channel is represented by a binary word placed in a time slot occupying a fixed position in the frame. In an asynchronous network logical channel binary data is conveyed by asynchronous transfer mode packets known as cells having a fixed length and including a header identifying the logical channel conveyed by the cell.

In the current state of the art synchronous telecommunication networks are clearly separated from asynchronous networks. When an asynchronous network needs to use conventional services available in a synchronous telecommunication network it uses a gateway between the two networks.

A gateway carries out cell assembly which consists in placing in a cell conveying a logical channel, binary words each representing one sample of a synchronous channel so that this data can be transmitted from the synchronous network to the asynchronous network. The gateway also carries out cell disassembly which consists in extracting from each cell received by the gateway binary words each corresponding to one sample of a synchronous channel and reconstructing a synchronous time-division multiplex link organized into recurrent frames having a fixed period, each frame being made up of time slots conveying respective different synchronous channels. The gateway places in these time slots the respective binary words corresponding to these synchronous channels.

In Europe, the synchronous digital channels are conveyed by 2.048 Mbit/s synchronous multiplex links organized into recurrent frames having a period of 125 microseconds. Each frame is divided into 32 time slots each conveying one octet corresponding to a 64 kbit/s channel. In the standard format each asynchronous transfer cell includes five header octets and 48 payload octets. The cell assembly device of a gateway could therefore assemble each cell by placing therein 48 octets representing 48 successive samples of the same synchronous channel. In fact, the cell assembly device used in a gateway of this kind places only two octets belonging to the same channel, for example, representing a cell assembly time of 0.25 ms. This is because CCITT Recommendation Q.551 places an upper limit of 1 ms on the round trip delay through a synchronous network. The cell assembly and disassembly device of a gateway of this kind thus causes a total delay of 0.5 ms. This conforms to the provisions of Recommendation Q.551 but is wasteful of resources as each cell includes 46 unused octets.

Asynchronous transfer mode switching centers have now reached a stage of development whereby it is feasible to use them as low-cost synchronous channel switching centers within synchronous networks. The very high bit rate of the asynchronous multiplex links processed by asynchronous switching networks makes it feasible to switch a very large number of synchronous channels with much less hardware than conventionally used in a synchronous channel switching center. The problem therefore arises of converting synchronous channels into asynchronous channels and of converting the asynchronous channels back into synchronous channels after switching. The prior art cell assembly device used in the type of gateway mentioned above is not suitable for this application because of the wasteful use of resources that the very low fill ratio of each cell produced by a cell assembly device of this kind represents.

SUMMARY OF THE INVENTION

The object of the invention is to propose:

- a cell assembly device for efficiently filling the cells to be switched by an asynchronous transfer mode switching network;
- a cell disassembly device for reconstructing a synchronous multiplex link from these cells after they are switched in an asynchronous transfer mode switching network so that it is possible to implement a synchronous switching center receiving and sending synchronous multiplex links; and
- an asynchronous switching center structure whereby cells produced by the cell assembly device of the invention can be routed successively to different asynchronous switching centers without being converted back into synchronous channels.

In the standard format, each cell has a fixed length and comprises five header octets and 48 data octets. However, there is also provision for using variable length cells, in particular within switching centers. European patent application EP-A-0 441 787 (Henrion 18) describes a switching center adapted to switch variable length cells by dividing them into between two and eight successive segments, depending on the requirements of the call that they are conveying, each segment having a fixed length. To identify these segments, the first segment begins with 11, the last segment begins with 01 and each intermediate segment begins with 00. All the segments of the same cell follow the same route in a switching center, so that their order is maintained.

The invention is therefore directed not only to fixed length cells but also to variable length cells.

In a first aspect the invention consists in a cell assembly device for assembling synchronous digital channels into fixed length asynchronous transfer mode cells, said synchronous channels being conveyed by synchronous multiplex links organized into recurrent frames with a fixed frame period and divided into time slots of fixed duration, a sample of each channel being represented by a binary word placed in a time slot occupying a fixed position in the frame; including means for placing in the same cell conveying a logical channel binary words respectively representing a plurality of different synchronous channels that can be conveyed by said logical channel; and characterized in that the binary words placed in the same fixed length cell represent samples of a plurality of channels conveyed by separate synchronous multiplex links.

In one embodiment, a cell assembly device for assembling digital synchronous channels into variable length cells is characterized in that it includes means for placing in the same variable length cell conveying a logical channel binary words respectively representing a plurality of different synchronous channels which can be conveyed by said logical channel; these means constituting a variable length cell, by assembling fixed length segments the number of which depends on the number of synchronous channels that can be conveyed by said logical channel.

The above two devices are more particularly intended for an application consisting in assembling cells from synchronous channels conveyed by a relatively high number of different synchronous multiplex links, as at the inputs of an access unit of a synchronous local switching center.

In a second aspect the invention consists in a cell disassembly device for disassembling synchronous digital channels placed by the cell assembly device in accordance with the invention in fixed or variable length asynchronous transfer mode cells, each cell conveying a series of binary words each representing one sample of a synchronous channel; including: means for extracting from each cell binary words at locations which are predetermined at the time of cell assembly and correspond to respective different synchronous channels; and for reconstructing at least one synchronous time-division multiplex link made up of recurrent frames having a fixed frame period, each frame comprising time slots having fixed durations and conveying respective synchronous channels, by placing in said time slots the binary words corresponding to the respective synchronous channels; characterized in that it includes means for reconstructing during each frame period a plurality of frames corresponding to respective multiplex links of a plurality of different multiplexes.

In a third aspect the invention consists in a switching center for switching synchronous digital channels conveyed by synchronous multiplex links organized into recurrent frames having a fixed frame period and divided into time slots having fixed durations, a sample of each channel being represented by a binary word placed in a time slot occupying a fixed position in the frame;

characterized in that it includes:

access units for incoming synchronous multiplex links including a cell assembly device according to the invention, for fixed or variable length cells;

access units for outgoing synchronous multiplex links each including a cell disassembly device according to the invention, for fixed or variable length cells;

an asynchronous transfer mode switching network setting up connections between the incoming synchronous multiplex access units and the outgoing synchronous multiplex access units to route the cells conveying the asynchronous channels.

As viewed from the outside, the above switching center is seen as a synchronous switching center and therefore has the advantage that it can be integrated into a synchronous network, like any conventional synchronous switching center, but at a much lower implementation cost since the core of the switching center is an asynchronous transfer mode switching network switching circuits with bit rates much higher than the bit rates of the circuits switched by a synchronous switching network.

In a fourth aspect the invention consists in a switching center for switching asynchronous digital channels for routing to other switching centers fixed or variable length cells produced by a cell assembly device according to the invention; said cells thus conveying binary words representing respective channels of a plurality of different asynchronous channels; said switching center including an asynchronous transfer mode switching network having a plurality of ports for asynchronous digital channels;

and being characterized in that it includes, connected to one of its ports, means for:

receiving cells conveying binary words representing respective channels of a plurality of different synchronous channels;

extracting from said cells the binary words that they convey; and placing in a plurality of separate cells conveying separate logical channels the extracted binary words representing respective samples of different synchronous channels which may not be conveyed by the same logical channel.

The above switching center can route across an asynchronous telecommunication network cells of fixed or variable length produced by cell assembly devices of the invention and can therefore route data from synchronous channels, maintaining to the greatest possible extent the filling efficiency characteristic of the cell assembly device of the invention, along the whole length of the path where the various synchronous channels may still be conveyed by the same logical channel.

BRIEF DESCRIPTION OF THE DRAWINGS

The invention will become clearer and further details of the invention will emerge from the following description and the accompanying figures.

DETAILED DESCRIPTION OF THE PREFERRED EMBODIMENTS

Figure 1:
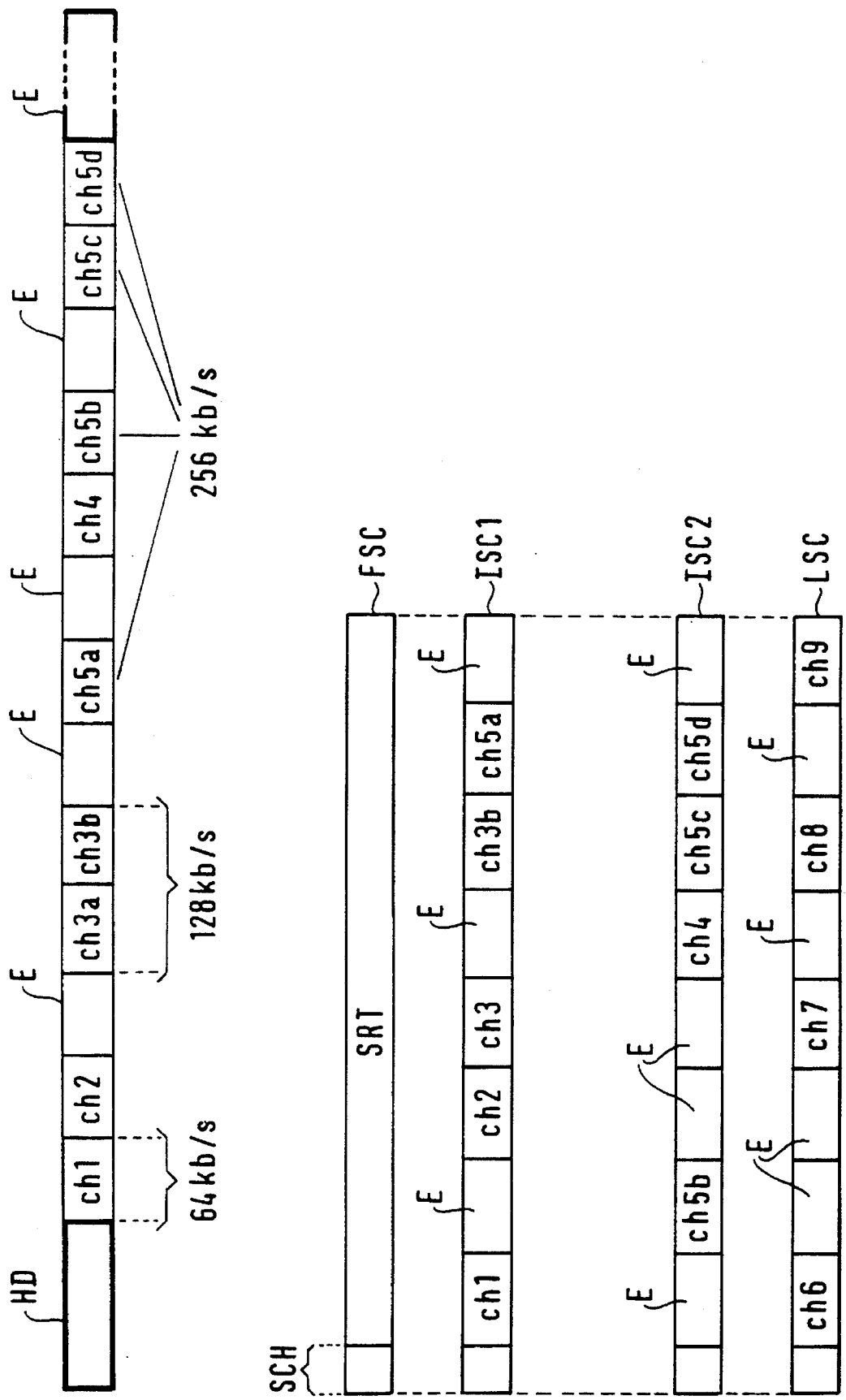
FIG. 1 is a diagram showing a composite cell produced by a cell assembly device of the invention, in the situation in which it produces fixed length cells and in the situation in which it produces variable length cells.

A synchronous digital channel cell assembly device of the invention produces composite cells like those shown in FIG. 1 by way of example.

The upper part of FIG. 1 shows a fixed length composite cell. This cell includes a header HD on five octets and a payload made up of 48 octets, conforming to CCITT recommendations concerning asynchronous transfer mode cells. This cell conveys octets representing respective samples of five different synchronous channels: an octet ch1 of a first channel having a bit rate of 64 kbit/s, an octet ch2 of a second channel having a bit rate of 64 kbit/s, two octets ch3a, ch3b of a third channel with an aggregate bit rate of 128 kbit/s, an octet ch4 of a fourth channel having a bit rate of 64 kbit/s, four octets ch5a, ch5b, ch5c, ch5d of a fifth channel having a bit rate of 256 kbit/s, and empty octets E. These empty octets E are randomly distributed in the cell and represent channels which have been released at the end of a call.

A channel can have a bit rate of N×64 kbit/s, with N assuming all values between 1 and 32 inclusive. It is possible for n octets of the payload of each composite cell to be reserved for transmitting a cyclic redundancy check type error control code.

When a call is to be set up and an additional channel is to be transmitted in a cell of this kind, the octet or octets representing a sample or samples of that channel are placed in that cell at the locations of the octets E which are empty at the time. If a sample of a channel is represented by more than one octet, as is the case with the four octets ch5a, ch5b, ch5c and ch5d, the octets are placed in locations of empty octets E which are not necessarily consecutive. This is why, in this example, two available octets E and an octet ch4 corresponding to a sample of the fourth channel are interleaved with the octets of the fifth channel. This placing is performed without violating the chronological order of the samples of each synchronous channel.

The lower part of FIG. 1 shows a composite cell that varies in length according to the number of synchronous channels addressed to the logical channel of which this cell is part. The cell includes, in each segment, eight payload octets and a header SCH made up of four control bits distinguishing, in particular:

a first segment FSC;

intermediate segments ISC1, ISC2; and a last segment LSC.

The first segment FSC conveys only a self-routing tag SRT. The other segments convey, for example, samples of nine different synchronous channels ch1, ch2, ch3a, ch3b, ch4, ch5a, ch5b, ch5c, ch5d, ch6, ch7, ch8, ch9 and empty octets E. The channels ch1 through ch5 are identical to those described above and the channels ch6 through ch9 have a bit rate of 64 kbit/s. The empty octets E are randomly distributed in the cell and represent channels that have been cleared down at the end of a call. The total number of segments per cell is limited to eight, for example, to optimize the performance of the switching centers. When an empty cell is transmitted it includes only the first segment FSC.

A standard format cell can easily be converted into a cell made up of eight segments: the first contains the self-routing tag SRT; the second contains three available octets and the five octets of the standard format cell header; and the other six contain the 48 data octets of the standard format cell.

The three octets available in the second segment are used in particular to:

indicate the length of the cell, by means of a three-bit field;

detect errors affecting the payload of the cell, by means of three cyclic redundancy code bits;

detect errors in these six bits, using a parity seventh bit.

Figure 2:
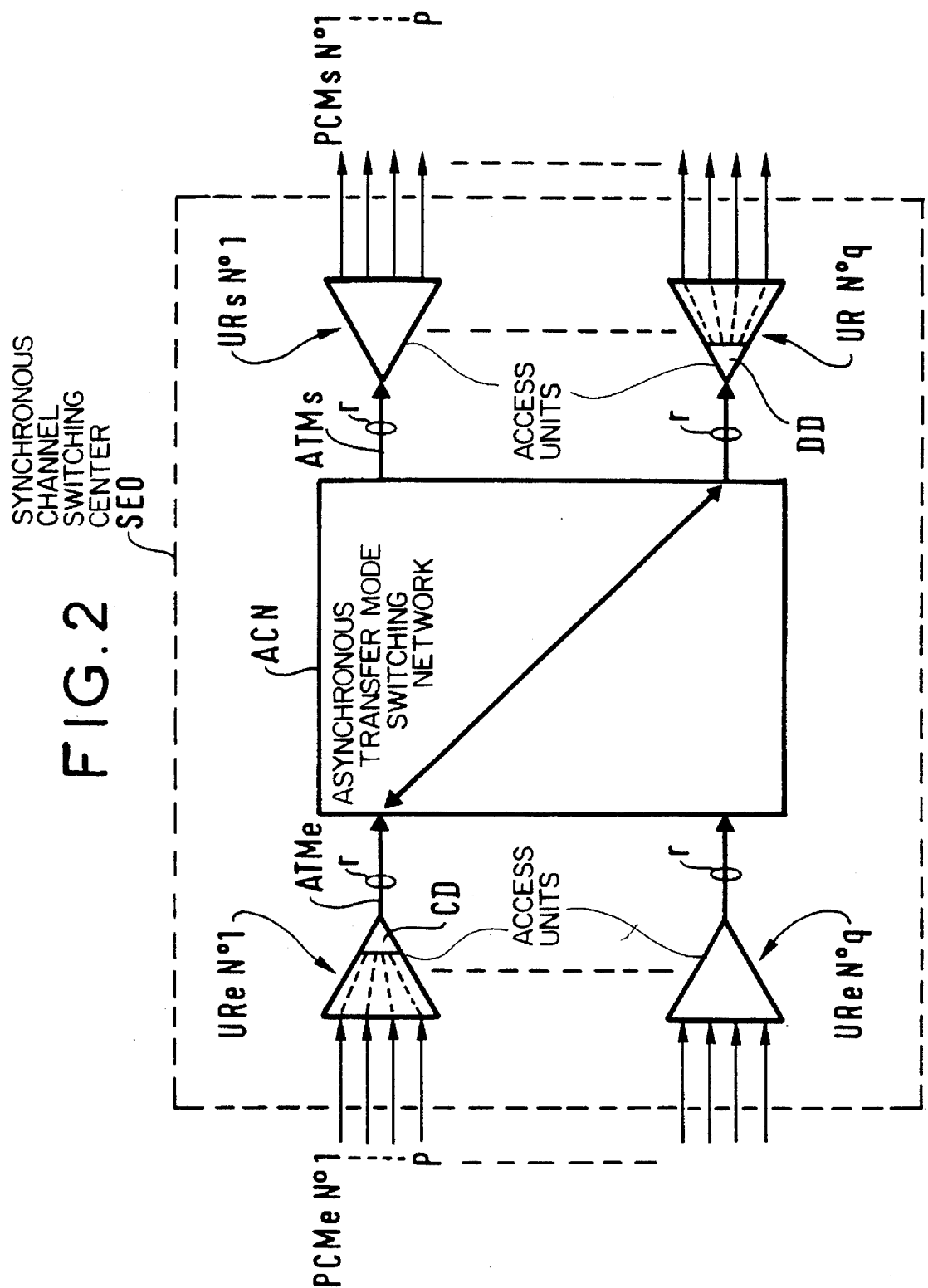
FIG. 2 shows the block diagram of a first embodiment of a synchronous digital channel switching center of the invention.

FIG. 2 shows the block diagram of one embodiment SE0 of the synchronous digital channel switching center of the invention. This switching center includes cell assembly and disassembly devices in accordance with the invention. The switching center includes:

q access units URe, each for connecting p incoming synchronous multiplex links PCMe n° 1, . . . , p;

an asynchronous transfer mode switching network ACN;

q access units URs, each for connecting p outgoing synchronous multiplex links PCMs n° 1, . . . , p.

Each access unit URe is connected to the switching network ACN by r asynchronous multiplex links ATMe. Each access unit URs is connected to the switching network ACN by r asynchronous multiplex links ATMs.

The switching network ACN can route a cell from any of the incoming asynchronous multiplexes ATMe to any of the outgoing asynchronous multiplex links ATMs and translate the identifier of the logical channel conveyed by the cell in the header of each cell. The structure and the operation of the switching network ACN are entirely conventional. In particular, the chronological order of the cells is preserved.

An access unit URe includes line interfaces which are identical to those of conventional access units for connecting incoming synchronous multiplex links in a synchronous transfer mode switching network and a new part in the form of a cell assembly device CD in accordance with the invention to be described below. Each access unit URs includes line interfaces identical to those of a conventional access unit for connecting outgoing synchronous multiplex links of a synchronous transfer mode switching network, and a new part in the form of a cell disassembly device DD in accordance with the invention to be described below.

The cell assembly devices CD and the cell disassembly devices DD process cells of fixed or variable length, depending on the type of switching network ACN concerned.

Figure 3:
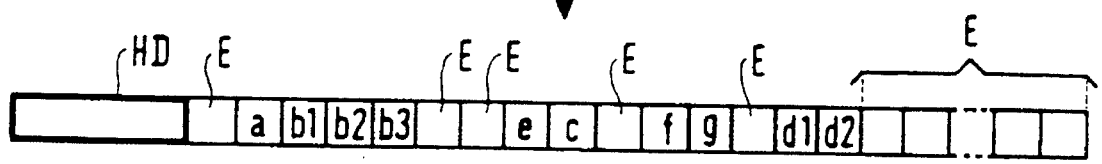
FIG. 3 illustrates the operation of this embodiment of the invention for one example of synchronous channels and for a given frame period.

FIG. 3 illustrates the operation of the embodiment of the invention shown in FIG. 2, showing the operation of cell assembly on octets a, b1, b2, b3, c, d1, d2, e, f, g which represent respective samples of different synchronous channels incoming on different incoming synchronous multiplex links PCMe n° 1, . . . , p to the first access unit URe and which must be routed to outgoing synchronous multiplex links PCMs n° 1, . . . , p all outgoing from the same access unit URs, for example unit n° q. All these octets are routed by the same logical channel connecting the unit URe n° 1 to the unit URs n° q. The other octets which do not have this characteristic are now shown in the figure.

The composite cell described here is a fixed length cell. A variable length cell is processed in exactly the same way in so far as the operations described above are concerned.

The cell assembly device of access unit URe n° 1 forms a composite cell including: a header HD containing an identifier which identifies this logical channel; a payload made up of octets a, b1, b2, b3, e, c, f, g, d1, d2; and empty octets E. This cell is routed by one of the asynchronous multiplex links ATMe to an input of the switching network ACN. The switching network ACN outputs this composite cell, with a new logical channel identifier in its header, on one of the asynchronous multiplex links ATMs connecting this network to the access unit URs n° q.

The cell disassembly device of the access unit URs n° q extracts the octets a, b1, b2, b3 from the composite cell and inserts them into the time slots of the frame of the synchronous multiplex link PCMs n° 2, for example; extracts the octet e from the composite cell and inserts it into a time slot of the frame of the synchronous multiplex link PCMs n° 3; extracts the octet c from the composite cell and inserts it into a time slot of the frame of the synchronous multiplex link PCMs n° 5; etc. The time slots TS of the synchronous frames PCMs are predetermined by a marking operation carried out during a phase preceding the setting up of each call.

Figure 4:
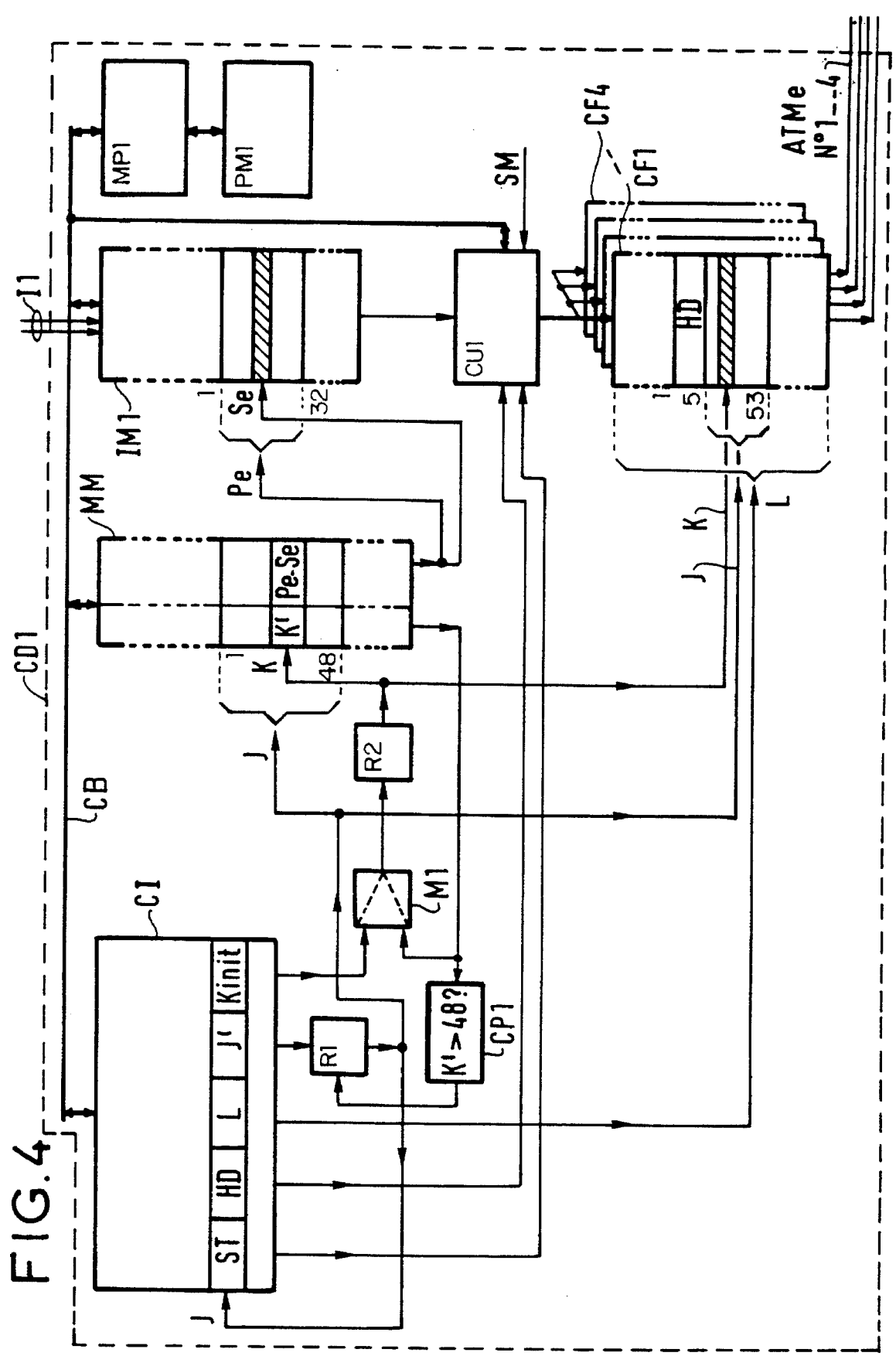
FIG. 4 shows the block diagram common to first and second embodiments of the cell assembly device of the invention, respectively for fixed length cells and for variable length cells.

FIG. 4 shows the block diagram of a first embodiment CD1 of the cell assembly device of the invention which can be used in the access units URe n° 1, . . . , q to supply fixed length cells. This first embodiment includes:

an input I1 receiving two synchronous time-division multiplex links each having a bit rate of 2.048 Mbit/s, i.e. a total of 64 octets in each period of 125 microseconds;

an output supplying four asynchronous multiplex links ATMe n° 1, . . . , n° 4, each multiplex link including up to 32 cells in each period of 125 microseconds;

an input memory IM1 having a capacity equivalent to 2.048 octets;

a cell identifier memory CI including a number of lines equal to the number of cells (128) that can be transmitted on all the multiplex links ATMe n° 1, . . . , 4, during a frame period, each line including: a field ST coded on two bits, indicating the status of the cell to be transmitted; a field HD coded on five octets, containing the header of the cell to be transmitted; a field L coded on two bits, indicating on which multiplex link ATMe this cell must be transmitted; a field J' coded on seven bits and a field Kinit coded on six bits, the respective functions of which are described below;

a marking memory MM including a number of pages (128) equal to the maximal number of cells that can be transmitted during a frame period, each page including 48 lines corresponding to the 48 payload octets of a cell, each line including: a first field K', the function of which is described below; and a second field Pe-Se which defines the address of a binary word representing a sample in the input memory IM1;

four identical cell formation memories CF1, . . . , CF4, each having a capacity of 32 cells, i.e. 1 696 octets, for forming up to 128 cells in each frame period;

a control circuit CU1 for controlling the memories CF1, . . . , CF4;

a microprocessor MP associated with a program memory PM and connected to the memories CI, MM, IM and to the circuit CU1 by a control bus CB;

two registers R1 and R2;

a multiplexer M1 with two inputs and one output;

a comparator CP1.

The cell formation memories CF1, . . . , CF4 each have an output constituting one output of the cell assembly device and supplying the asynchronous multiplexes ATMe n° 1, . . . , n° 4. These memories each have:

a selection unit connected to an output of the cell identifier memory CI to receive a binary word L selecting one of the memories CF1, . . . , CF4;

a page selection address input connected to the output of the register R1 to receive a binary word J selecting a page containing the 53 octets constituting a cell to be transmitted;

an octet address input connected to the output of the register R2 to receive a binary word K for writing an octet.

Each of the memories CF1, . . . , CF4 has a data input connected to an output of the control unit CU1 to receive an octet to be written into one of these memories, at a location selected by the binary words L, J, K. The content of each of the memories CF1, . . . , CF4 is read sequentially from address 1 through address 1 696 in order to transmit 32 cells in succession during each frame period, the duration of which is 125 microseconds. The means controlling reading of the memories CF1, . . . , CF4 and the means for transmitting empty cells, if necessary, can be incorporated into the control unit CU1. To simplify the drawing they are not shown in detail.

The control unit CU1 has: an input-output connected to the control bus CB; an input connected to an output of the input memory IM1, to receive an octet representing a sample of a synchronous channel; and two inputs connected to a respective two outputs of the cell identifier memory CI to receive a cell header HD and a binary word ST, respectively, the binary word ST indicating the status of a cell to be transmitted. The word ST can take the following values:

00 if the cell is active for switching, the format of the cell being then described by the content of the marking memory MM;

01 if the cell is inactive for switching, the time slot corresponding to this cell being then usable for transmitting an internal signalling cell the data in which is read in a memory SM analogous to the input memory IM which is not shown in the figure but which is connected to one input of the control unit CU1;

10 if the connection to be taken by the cell is currently being set up.

The header HD is conventional and includes: a virtual circuit group identifier field which consists of the number of the outgoing access unit URs to which the cell is addressed; and a virtual circuit identifier field which consists of the number of a logical channel connecting an incoming access unit URe to an outgoing access unit URs.

The data is written into the cell identifier memory CI by writing means (not shown) which include means for management of available addresses so that each line released after transmitting a cell can be re-used.

The input memory IM1 has a data input connected to the input I1 of the cell assembly device D1, a control input-output connected to the control bus CB, and a read address input connected to an output of the marking memory MM to receive a page address Pe and a line address Se for reading an octet corresponding to the given time slot in a given synchronous frame. Each page of the memory IM1 stores 32 octets representing 32 samples of a synchronous frame conveying 32 synchronous channels. The synchronous channel octets are read randomly and according to the content of the marking memory MM.

These octets are written into the input memory IM1 as and when they are received at the input I1, at an address supplied by an available address manager circuit which is conventional and is not shown in the figure. The memory IM1 is duplicated to enable resynchronization of synchronous multiplexes received at the input I1 to a local clock of the cell assembly circuit CD1. Resynchronization entails losing or duplicating a complete frame of a synchronous multiplex. To simplify the figure the second memory IM1 is not shown.

The marking memory MM contains marking information relative to the switching of the synchronous channels to each asynchronous logical channel outgoing from the cell assembly device CD1. This information is stored in the form of a list of links. The memory MM includes one page for each cell to be transmitted, each page including 48 lines corresponding to the 48 octets of the payload of a cell. The memory MM thus includes 6 144 lines, so that it can transmit up to 128 cells in each frame period.

The use of a list of links to retrieve the marking data has the advantage of optimizing management of access time to the input memory IM1. The number of read cycles in the memory IM1 is typically 2 048 cycles in each period of 125 microseconds. Each line in the memory MM includes two fields: a first field contains a binary word K' which is the next line address to read in the marking memory MM and in a cell formation memory CF1, ..., CF4; and a second field contains a binary word Pe-Se which is the next page address and the next line address to read in the input memory IM1.

An output of the memory MM supplies a binary word K' and is connected to an input of the comparator CP1 and to a first input of the multiplexer M1. The output of the multiplexer M1 is connected to an input of the register R2. The output of the register R2 supplies a binary word K which is a current line address for reading in the memories MM and CF1, ..., CF4. The second input of the multiplexer M1 is connected to an output of the cell identifier memory CI which supplies to it an initial line address value Kinit. The multiplexer M1 also has a control input (not shown) connected to the control bus CB by an interface (also not shown). The register R2 has a control unit (not shown) connected to the control bus CB by an interface (also not shown).

The microprocessor MP1 controls the operating sequences of the cell assembly device using the program stored in the program memory PM. The control bus CB carries commands output by the microprocessor MP. In particular, the microprocessor MP commands: the writing of marking data into the memory MM; the writing of cell identifiers into the memory CI; writing in the register R2; and switching of the multiplexer M1.

The marking memory MM further includes a page address input connected to the output of the register R1 which supplies a binary word J. This constitutes a page address for reading the memory MM and the memories CF1, ..., CF4. The register R1 has a control input connected to the output of the comparator CP1 and a data input connected to an output of the memory CI to receive a binary word J' which is the next page address value. The comparator CP compares the value of K' and a threshold value equal to 48. If K' reaches the value 49, the comparator CP1 commands substitution of J' for J in register R1. The cell identifier memory CI includes a read address input connected to the output of the register R1 to receive J which constitutes the current read address for the memory CI. The latter further includes a control input-output connected to the control bus CB.

The connections set up within the asynchronous transfer mode (ATM) network ACN are quasi-semipermanent as they do not need to be modified at the same rate as calls are set up on the synchronous channels, except for the peak bit rate parameter characterizing the resources needed for a connection, which changes only slowly. When the switching center is initialized, a connection is set up in the asynchronous transfer mode network ACN between all the pairs comprising an input access unit URe and an output access unit URs, so that each pair can communicate. The set of quasi-semipermanent connections is thus defined in each input access unit URe by a table and in each access unit URs by another table. These tables are established by a conventional method of establishing quasi-semipermanent connections in an asynchronous switching network.

When the switching network has been initialized, and when operation has stabilized, the marking of a new connection in the network includes the following steps for connecting a given access unit URe, a given synchronous multiplex link PCMe and a given channel TSe to a given access unit URs, a given synchronous multiplex link PCMs and a given synchronous channel TSs:

the access unit URe asks the access unit URs to set up a connection. This connection can be carried either by a virtual circuit already set up within a virtual circuit group VP or by a new virtual circuit if the resource requested is not available on the virtual circuits already set up;

in return, the access unit URs supplies to the access unit URe: the identifier VP of a virtual circuit group, the identifier VC of a virtual circuit and the identifier of an octet to be used, plus an indication as to whether the connection is new or not.

A distinction has to be made between two cases:

a) If the ATM connection in the network ACN is new, the access unit URe chooses the time at which the cell will be transmitted within the respective period of 125 microseconds and prepares a connection. The time at which the cell is transmitted is fixed by the choice of the value J which constitutes the page address for reading the memory MM and one of the memories CF1, ..., CF4. The access unit URe prepares the connection by marking the following fields in the memory CI at the address J:

AE=10 (connection being set up).

HD=VP, VC; the identifiers of the virtual circuit group and the virtual circuit to be used.

L=asynchronous multiplex link ATMs to be used.

Kinit=address of first line on page J.

J'=address of identifier of next cell to be formed.

The access unit URe writes, at an address Jp containing the identifier of the cell preceding the cell being formed, the value J in the field to contain a subsequent line address.

And, finally, it marks the following fields in the marking memory MM, at the address Kinit:

Pe-Se: the identifier of a synchronous multiplex link and the identifier of an incoming synchronous channel in the access unit URe, respectively;

K'=49: a marker identifying the end of cell assembly, the preceding 48 lines of page J being used to constitute a cell including up to 48 payload octets.

When the connection has been set up, the field ST at the address J in the cell identifying memory CI is changed from 10 to 00.

b) If the connection has not been set up already, the access unit URe introduces an additional ATM connection by marking in the memory MM, at the address K=No, a field Pe-Se designating a synchronous multiplex and a synchronous channel in that multiplex link and a marker K'=49 used to mark the end of cell assembly. Also, the access unit URe writes a field of value No instead of 49 at the address of the last octet assembled into a cell before the connection is set up.

To set up a connection having a bit rate of N×64 kbit/s the marking operations described above are repeated N times.

The octets in the input memory IM1 are read and then written into the ATM cell formation memories CF1, ..., CF4, in accordance with marking instructions read from the marking memory MM. Immediately a cell has been completely formed in a cell formation memory it is transmitted on the asynchronous multiplex link respective to that memory at a bit rate of 150 Mbit/s.

During the formation of a given ATM cell the value J is fixed and the value K varies from 1 through 48, increasing but not necessarily continuously. The variation in the value of K does not necessarily start from 1 and some values can be skipped if some octets of a cell are empty.

Reading a marker K'=49 indicates the end of the formation of the payload of a cell. The comparator CP commands the register R1 to supply a new page address J' to the memory M.

The physical address for reading the first line on page J of the memory MM is:

$$AMM=48 \times J+No, \text{ where No is a constant.}$$

The physical address for reading line K on page J of the memory MM is:

AMM=48×J+No+K, where K takes various values between 1 and 48, the value 49 being used only to indicate the end of cell assembly.

One of the cell formation memories CF1, ..., CF4 is selected by the binary word L supplied by the cell identifier memory CI. The physical address for writing in one of the memories CF1, ..., CF4 to read the first octet of the header HD of a cell corresponding to page J is:

$$ACF=53 \times J+N1 \text{ where } N1 \text{ is a constant.}$$

The addresses ACF each for writing five octets of the header HD in one of the memories CF1, ..., CF4 are supplied by the unit CU1 at the same time as the values of these five octets.

The physical address for writing in one of the memories CF1, ..., CF4 for writing the first octet of the payload of a cell corresponding to page J is:

$$ACF=53 \times J+N1+5.$$

The physical address for writing the Kth octet of the payload of the cell into one of the ATM cell formation memories CF1, ..., CF4 is:

$$ACF=53 \times J+N1+5+K.$$

The initial value Kinit of K, which is not necessarily 0, is supplied by the cell identifier memory CI and is then transmitted by a multiplexer M1 at the time of initialization of cell formation. After this initialization the multiplexer M1 changes state and transmits the binary word K' read from the memory MM which constitutes the next line address K. If the next line address K' is equal to 49, this indicates that there is no next line to write in the current page J. The comparator CP1 commands the register R1 to memorize and transmit to its output a new page address J' supplied by the cell identifier memory CI. Also, each address J is used as a line address for reading the next line in the memory CI.

Figure 5:
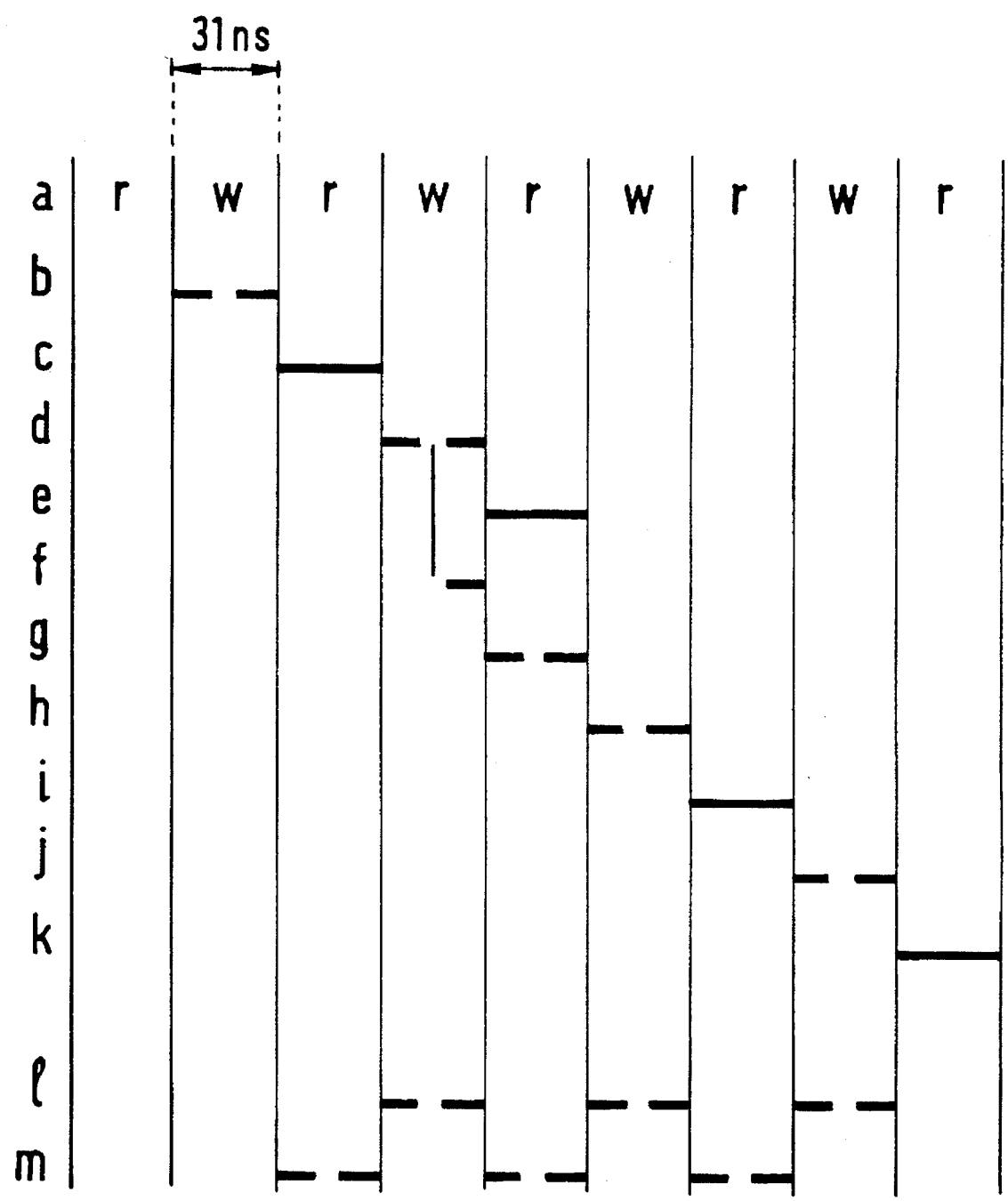
FIG. 5 shows a timing diagram illustrating the operation of this embodiment of the invention.

FIG. 5 shows a timing diagram including lines a, b, c, ..., m respectively showing:

a) the read and write cycles r and w, respectively, for the memory IM, each read operation and each write operation having a duration of 31 ns, each frame period including 2 048 read-write cycles;

b) a read operation in the memory MM and then a change of the line address K, during a write cycle in the memory IM;

c) a write operation in one of the memories CF1, ..., CF4 during a read operation in the memory IM;

d) a read operation in the memory MM and then a change of the line address K during an IM write operation;

e) a write operation in one of the memories CF1, ..., CF4 during a read operation in the memory IM;

f) detection of end of cell assembly, which occurs during a write cycle in the memory IM, in parallel with the change in the value of the line address K;

g) for a new cell assembly, a read operation in the memory CI and then loading into the register R2 of the initial value Kinit of the line address for the new cell to be formed;

h) a read operation in the memory MM and then a change in the value of the line address K during a write operation in the memory IM;

i) a write operation in one of the cell formation memories CF1, ..., CF4 during a read operation in the memory IM;

j) a read operation in the memory MM and then a change in the value of the line address K during a write operation in the memory IM;

k) a write operation in one of the cell formation memories CF1, ..., CF4 during a read operation in the memory IM.

These operations continue until the end of cell assembly for the current cell.

The last two lines, l and m, illustrate the operations for marking a connection:

l) a read operation and then a write operation in the cell identifier memory CI during each write operation in the memory IM;

m) a read operation and then a write operation in the marking memory MM during each read operation in the memory IM.

A second embodiment of the cell assembly device of the invention producing variable length cells can be derived from the first embodiment. The block diagram of this second embodiment of the invention is identical to that of the first, shown in FIG. 4. Only the differences in how they operate are described below.

The second embodiment of the invention uses different routing data, but this does not alter the cell disassembly process in any way. The HD field in the cell identifier field CI is modified. It still contains routing data, but this comprises: a self-routing tag SRT, to be used in subsequent switching stages, instead of the standard former header; and a three-bit field indicating the length of the cell in question, i.e. the number of segments in it. This number of segments is determined by the microprocessor MP1 according to the traffic to be routed on the logical channel to which the cell in question belongs. This length is used by the control circuit CU1 to control the cell formation memories CF1, ..., CF4.

Instead of reading 53 successive octets for the 32 successive cells formed in each memory CF1, ..., CF4, the control unit CU1 reads only a number of octets for each cell corresponding to the length indicated in the HD field supplied by the memory CI; it then jumps to the read address corresponding to the next cell. Each cell formation memory CF1, ..., CF4 is therefore managed as a queue in which the variable length cells are placed end to end.

When a cell is completed it is queued in the queue corresponding to one of the four multiplex links ATMe n° 1, ..., n° 4, according to the field L read in the memory CI. It is then transmitted as soon as possible on this multiplex link. When a queue is empty the control unit CU1 commands the transmission of empty cells comprising a single segment.

Figure 6:
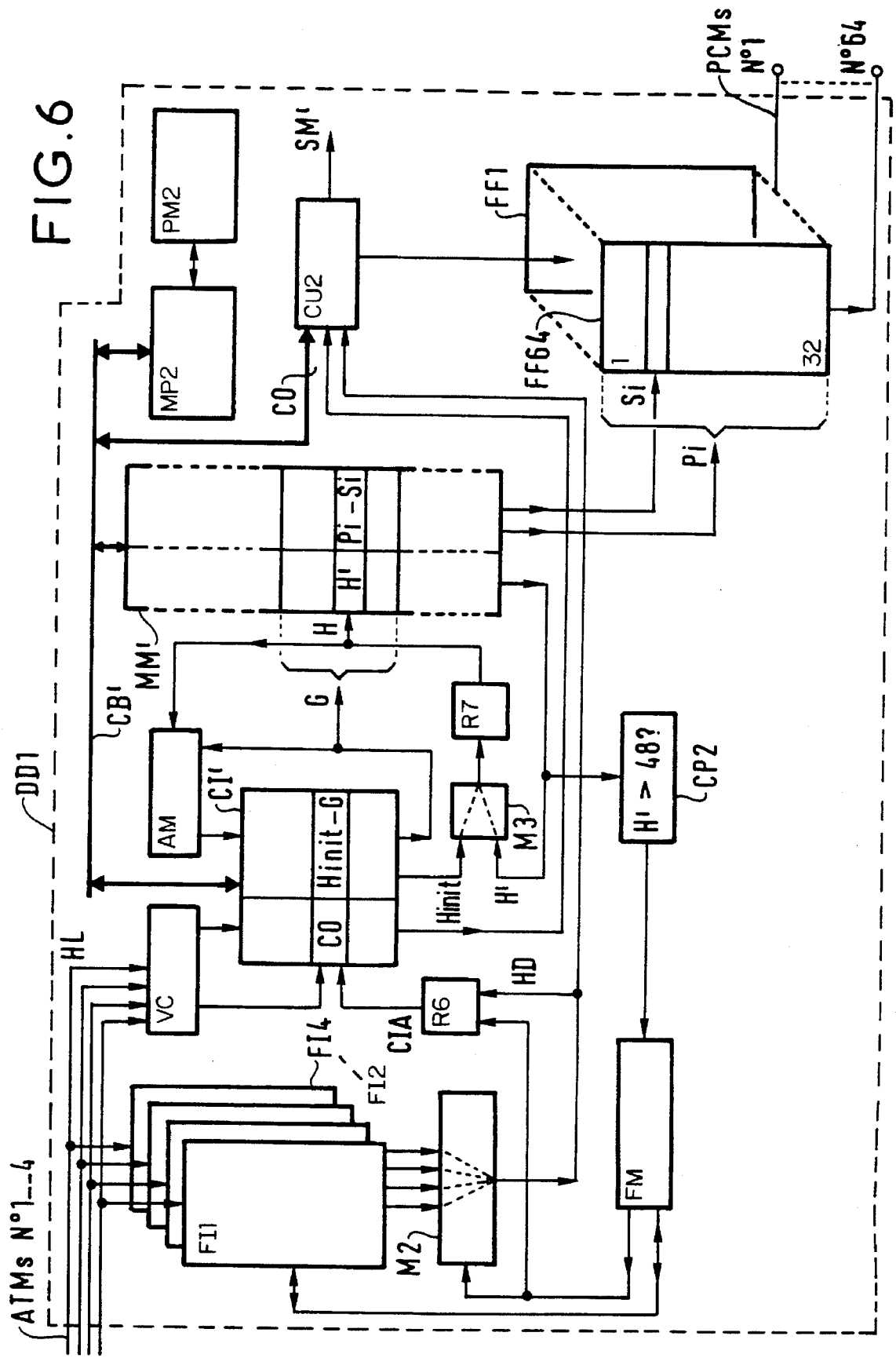
FIG. 6 shows the block diagram common to first and second embodiments of the cell disassembly device of the invention, respectively for fixed length cells and for variable length cells.

FIG. 6 shows the block diagram of a first embodiment DD1 of the cell disassembly device of the invention. The same block diagram covers fixed length cells and variable length cells. It includes:

four first in/first out memories FI1, ..., FI4 each having a data input connected to one of the asynchronous multiplex links ATMs n° 1, ..., n° 4; they have a total capacity of 96 cells;

a multiplexer M2 having four inputs and one output for combining on the same output data read in the four memories FI1, ..., FI4;

a circuit VC for verifying the identity of each cell received by the access unit URs included in the cell disassembly device;

a cell identifier memory CI' including 16 384 lines corresponding to a capacity of 16 384 cells received by the device DD1;

a marking memory MM' including 128 pages each of 48 lines, each page corresponding to one of the 128 cells maximum that the access unit URs can receive during a frame period and each line corresponding to one octet of the payload of that cell;

64 frame formation memories FF1, ..., FF64 each having an output connected to a respective one of the synchronous multiplex links PCMs n° 1, ..., n° 64;

two registers R6 and R7;

a control unit CU2 associated with the frame formation memories FF1, ..., FF64;

a queue manager circuit FM which is connected to the memories FI1, ..., FI4;

a circuit AM for managing available addresses in the marking memory MM';

a comparator CP2;

a multiplexer M3 having two inputs and one output;

a microprocessor MP2 associated with a program memory PM2 and connected to a control bus CB' to control the operation of the cell disassembly device DD1 as a whole.

This embodiment of the invention also includes an internal signalling message memory SM' which is not shown in the figure, to simplify the latter, and which has a data input connected to an output of the control unit CU2.

Consider first the operation of this device in the case of fixed length cells.

The cells received by the cell disassembly device DD1 are processed one by one, the circuit FM reading the successive queues in the memories FI1, ..., FI4. The octets representing the samples of synchronous channels are written at non-consecutive addresses into the frame formation memories FF1, ..., FF64 according to marking data supplied by the memory MM'. These memories FF1, ..., FF64 include: a data input connected to an output of the control unit CU2; a write address input selecting one of these memories by means of a binary word Pi whose value is the number of the synchronous multiplex link PCMs to which the octet supplied by the unit CU2 is addressed; and a line address input receiving a binary word Si whose value is the rank of the time slot to carry this octet in the frame currently being formed.

Read addressing means (not shown) are associated with the memories FF1, ..., FF64 to read each of them sequentially in order to supply a frame of 32 octets to each multiplex link PCMs n° 1, ..., n° 64 every 125 microseconds.

Consider first the storage of the data corresponding to a cell, before considering reconstruction of the synchronous multiplex frames. The asynchronous multiplex links ATMs n° 1, ..., n° 4 are respectively connected to the inputs of the memories FI1, ..., FI4 and are respectively connected to four inputs of the verification circuit VC. These four input of the circuit VC sample only the headers HD. In each header HD the circuit VC samples the virtual circuit group identifier and the virtual circuit identifier and also takes account of the number of the asynchronous multiplex link ATMs routing the cell. The circuit VC deduces therefrom a status code CO which takes the following values:

00 if this is an expected cell containing synchronous channel octets;

01 if this is an expected cell containing an internal signalling message;

10 if this is an unexpected cell and therefore the result of an error.

One output of the circuit VC is connected to a data input of the memory CI' to supply to it the code CO which constitutes one field of the binary word identifying the cell. Another output is connected to a write address of the memory CI' to supply to it a write address comprising the virtual circuit group identifier and the virtual circuit identifier. Each line of the memory CI' contains a cell identifier consisting of the binary word CO mentioned above, a binary word Hinit and a binary word G whose values are determined by the circuit AM for managing free addresses in the memory MM', for all the cells received during the frame period in question. The value of G is a page address corresponding to the cell in question and the value of Hinit is an initial line address, within this page, for subsequent reading in the marking memory MM'.

The memory MM' includes 128 pages each of 48 lines containing marking data which is predetermined at the time of setting connections in the asynchronous switching network ACN.

The memories FI1, ..., FI4 and the management circuit FM constitute the queues which are read in the order of cell arrival. Each cell is output in succession from the output of the multiplexer M2 in the form of a stream of octets. The multiplexer M2 has a control input connected to an output of the management circuit FM to command the multiplexer M2 to transmit the octets supplied by one of the memories FI1, ..., FI4, reading of which is commanded by the circuit FM. This output of the circuit FM is also connected to an input of the register R6 to supply to the latter two bits designating the multiplex ATMs n° 1, ..., 4 which has received the cell being read in one of the memories FI1, ..., FI4.

The first five octets of each cell constitute the header HD of the cell and are sampled by the register R6, together with the two bits identifying one of the multiplex links ATMs n° 1, ..., 4. The register R6 memorizes these two bits and the field of the header HD containing the virtual circuit group identifier and the virtual circuit identifier. The value of these two bits and the two identifiers constitute a read address CIA which is applied to the read address input of the cell identifier memory CI'. A read operation in this memory CI' supplies the identifier of the cell output by the queues: a first output of the memory CI' connected to an input of the control unit CU2 supplies the binary word CO and indicates the nature of the cell output by the queues. At the same time the octets of the payload of this cell are supplied by the output of the multiplexer M2 to an input of the unit CU2. If the cell is an expected cell containing synchronous channel octets, the channel CU2 retransmits these octets to the data input common to the frame formation memories FF1, ..., FF64.

If the cell output from the queues is an expected cell but contains only an internal signalling message, the unit CU2 transmits the payload of this cell to the internal signalling message memory SM', not shown in the figure.

If the cell output is a cell which has arrived on the asynchronous multiplex links ATMs n° 1, ..., n° 4 because of an error, the control unit CU2 does not transmit the payload of the cell.

Reading the cell identifier memory CI' at the address CIA also supplies the binary word on a second output of the memory CI' to one input of the circuit AM and to a page address input of the marking memory MM'. A third output of the memory CI' supplies the binary word Hinit to a first input of the multiplexer M3. At the start of processing a reconstructed cell the multiplexer M3 transmits the binary word Hinit to the input of the register R7. The multiplexer M3 then transmits the binary word H' which is supplied to its second input from a first output of the marking memory MM'.

The register R7 has one input connected to a line address input of the memory MM'. This output supplies a line address H supplying one line on page G. This line contains:

a binary word H' whose value is the next line address to be used to read the memory MM';

a binary word Pi and a binary word Si which are respectively a number designating one of the synchronous multiplex links PCMs n° 1, . . . , 4 and a time slot number in a frame of the synchronous multiplex.

The value of Hinit designates the first line of page G in memory MM' actually containing wanted data, since not all the lines on a page are necessarily used. The value of H' indicates the next line to read on page G.

The physical read address in the memory MM' for the first line of a page is:

$$AMM'=G \times 48+N4, \text{ where } N4 \text{ is a constant.}$$

The physical read address in the memory MM' for each of the other lines on this page is:
AMM'=G×48+N4+H, where H takes certain values between 1 and 48, without necessarily taking all of them. The first output of the memory MM' supplies the value of H' to the second input of multiplexer M3 and to one input of the comparator CP2. The multiplexer M3 has a control input (not shown) connected to the control bus CB' by an interface (not shown) to switch this multiplexer after a first read operation in the memory MM'. The output of the multiplexer M3 transmits the value H' to the register R7 where it is memorized at the end of the read cycle in the memory MM'. The value of H' is then used to read a new line on page G, this line not usually being consecutive to the line previously read.

The comparator CP2 compares the value of H' to a threshold value equal to 48 and supplies a logic signal resulting from this comparison to an input of the queue manager circuit FM. If the binary word H' read in the memory MM' has a value equal to 49, this indicates that disassembly of a cell is complete. The queue manager circuit FM can then proceed immediately with the frame disassembly of another ATM cell, which saves time if the previous cell included many empty octets.

The values Pi and Si constitute a write address for writing an octet of the payload of the cell into one of the frame formation memories FF1, . . . , FF64. A second output of the memory MM' supplies the value of Si to an address input common to all the memories FF1, . . . , FF64. A third output of the memory MM' supplies the value Pi to a memory selection address FF1, . . . , FF64 to select one of these memories. The figure does not show the conventional means needed to transmit a synchronous multiplex link: a resynchronization memory able to hold two frames of each synchronous multiplex, a clock synchronization device, a cyclic redundancy code generator device, a device for generating signalling signals to be inserted into time slots n° 0 and n° 16 of each frame, etc.

Figure 7:
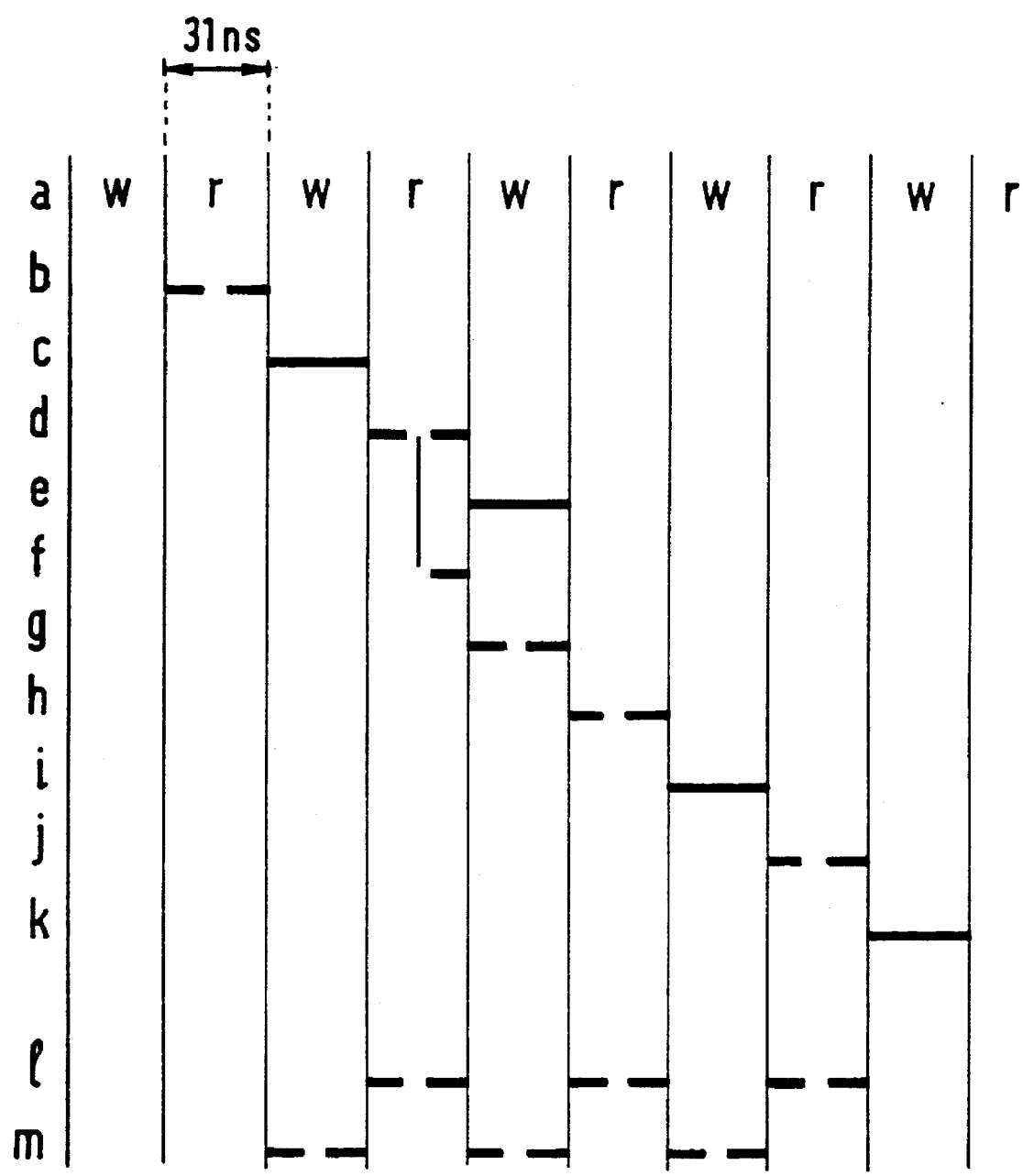
FIG. 7 shows a timing diagram illustrating the operation of this embodiment of the invention.

FIG. 7 shows a timing diagram including lines a, b, c, . . . , m illustrating the operation of this first embodiment of the cell disassembly device DD1:

a) the alternating read and write operations in the frame formation memories FF1, . . . , FF64, where w represents the write operation and r represents the read operation. Each of these operations takes 31 ns and there are 2 048 read cycles and 2 048 write cycles during each frame period of 125 microseconds;

b) a read operation in the marking memory MM' and a change of the line address value H, which is replaced by the value H' read in this memory during a read operation in a memory FF;

c) a read operation in the input memory FI1, . . . , FI4 during a write cycle in the memory FF;

d) a read operation in the marking memory MM' and then a change in the value of H which is replaced with the value H' read in this memory during a read cycle in the memory FF;

e) a read operation in the input memory FI1, . . . , FI4 during a write cycle in a memory FF;

f) the detection of the last octet of a cell during the second half of a read cycle in a memory FF;

g) the processing of a new cell: a read operation in the cell identifier memory CI' followed by loading of the value Hinit into the register R7 during a read cycle of a memory FF;

h) a read operation in the marking memory MM' and then a change in the value of H, the value of Hinit being replaced by the value of H' read in the memory MM' during a read cycle in a memory FF;

i) a read operation in an input memory FI1, . . . , FI4 during a write cycle in a memory FF;

j) a read operation in a marking memory MM' and then a change in the value of H for which is substituted the value of H' read in the memory MM' during a read cycle in a memory FF;

k) a read operation in an input memory FI1, . . . , FI4 during a write cycle in a memory FF.

The operations of marking connections are represented by lines l and m in this timing diagram:

l) a read operation and then a write operation in the cell identifier memory CI' carried out during each read cycle in a memory FF;

m) a read operation and then a write operation in the marking memory MM' during each write cycle in a memory FF.

A second embodiment of the cell disassembly device, for variable length cells, can be deduced from this first embodiment and its block diagram can be identical to that shown in FIG. 6. Only the differences in how they operate are described below.

This second embodiment of the invention is more specifically suited to cells with routing data in the form of a self-routing tag. The circuit VC for verifying the identity of each cell verifies the self-routing tag of each cell, instead of the virtual circuit group identifier and the virtual circuit identifier. It supplies to the write address input of the memory CI' an address corresponding to a logical channel number deduced from a self-routing tag.

The circuit FM for managing the queues commands the memories FI1, . . . , FI4 to constitute queues in which the variable length cells are memorized end to end and then output cell by cell, the length of each cell being indicated by three bits in the data conveyed by each cell.

Consider the various time-delays for transit from one synchronous channel to another synchronous channel. In the input access unit URe the transit time-delay is made up of the following time-delays:

the use of a duplicated input memory MI for resynchronizing an incoming synchronous multiplex link imposes a memory transit time-delay which is equal to 125 microseconds maximum and to 62.5 microseconds on average;

the formation of a cell can have a maximal duration of 44 octets, i.e. 2.69 microseconds;

the time to transmit a cell on a 155 Mbit/s asynchronous multiplex link is 2.736 microseconds. A cell formation memory CF1, . . . , CF4 can receive 32 contiguous cells in the worst case. The maximum delay is suffered by the last cell and is equal to 85.6 microseconds. The mean time-delay in these memories is therefore 42.8 microseconds.

In conclusion, the transit time-delay of the access unit URe is estimated at 214 microseconds maximum and 108 microseconds on average.

The transit time-delay in an outgoing access unit URs comprises the following time-delays:

the time-delay of one of the queues in the memories FI1, . . . , FI4. Each contains 96 cells maximum, i.e. a maximum time-delay of 258 microseconds, but each contains 0.5 cell on average, i.e. a time-delay of 1.4 microseconds;

the time to disassemble one cell is equal to 2.69 microseconds maximum;

the time to retransmit a synchronous channel sample in a synchronous frame has a maximal duration of 125 microseconds and a mean duration of 62.5 microseconds.

In conclusion, the estimated total transit time-delay for the outgoing access unit URs is therefore: 386 microseconds maximum, 67 microseconds on average.

The total transit time-delay for the two access units URe and URs, in one direction, is thus: 600 microseconds maximum, 175 microseconds on average.

To adhere to a maximal return time-delay of 900 microseconds it is necessary and sufficient for the switching network ACN to have a return time-delay of 300 microseconds in the worst case and 550 microseconds on average. Prior art asynchronous transfer mode switching networks can have transit times below these values.

The cell assembly device and the cell disassembly device of the invention thus enable implementation of a synchronous switching center including an asynchronous switching network which is used efficiently because the cells have a high fill ratio whilst complying with Recommendation Q.551. In the embodiments described above each sample of a synchronous channel is represented by a single octet, but an alternative embodiment could represent each sample by an octet representing its value and an additional octet containing an error detection code. How to adapt the embodiments described above to cater for two octets per sample will be apparent to the person skilled in the art.

The examples described previously show the application of the cell assembly device and the cell disassembly device of the invention to the implementation of a synchronous switching center. The devices of the invention also enable the implementation of asynchronous switching centers for routing composite cells produced by a cell assembly device of the invention to asynchronous or synchronous switching centers.

The cell assembly device and the cell disassembly device of the invention can broadcast a tone or a recorded announcement from a synchronous channel to any other synchronous channel. The broadcasting is done at the level of the switching network ACN and at the level of the cell disassembly devices DD in the output access units URs n° 1, . . . , q. To effect broadcasting the microprocessor MP2 of the cell disassembly device DD1, for example, writes the same marking data more than once into the marking memory MM', so that the same octet is transferred several times from an input memory FI1, . . . , FI4 to the frame formation memories FF1, . . . , FF64, so that the octet is transmitted in more than one synchronous channels.

The cell assembly device and the cell disassembly device of the invention further provide for carrying out a synchronous channel continuity test. This test consists in transmitting test octets periodically on each synchronous channel from the cell assembly device and verifying the presence of the same test octets at the output of the cell disassembly device.

Figure 8:
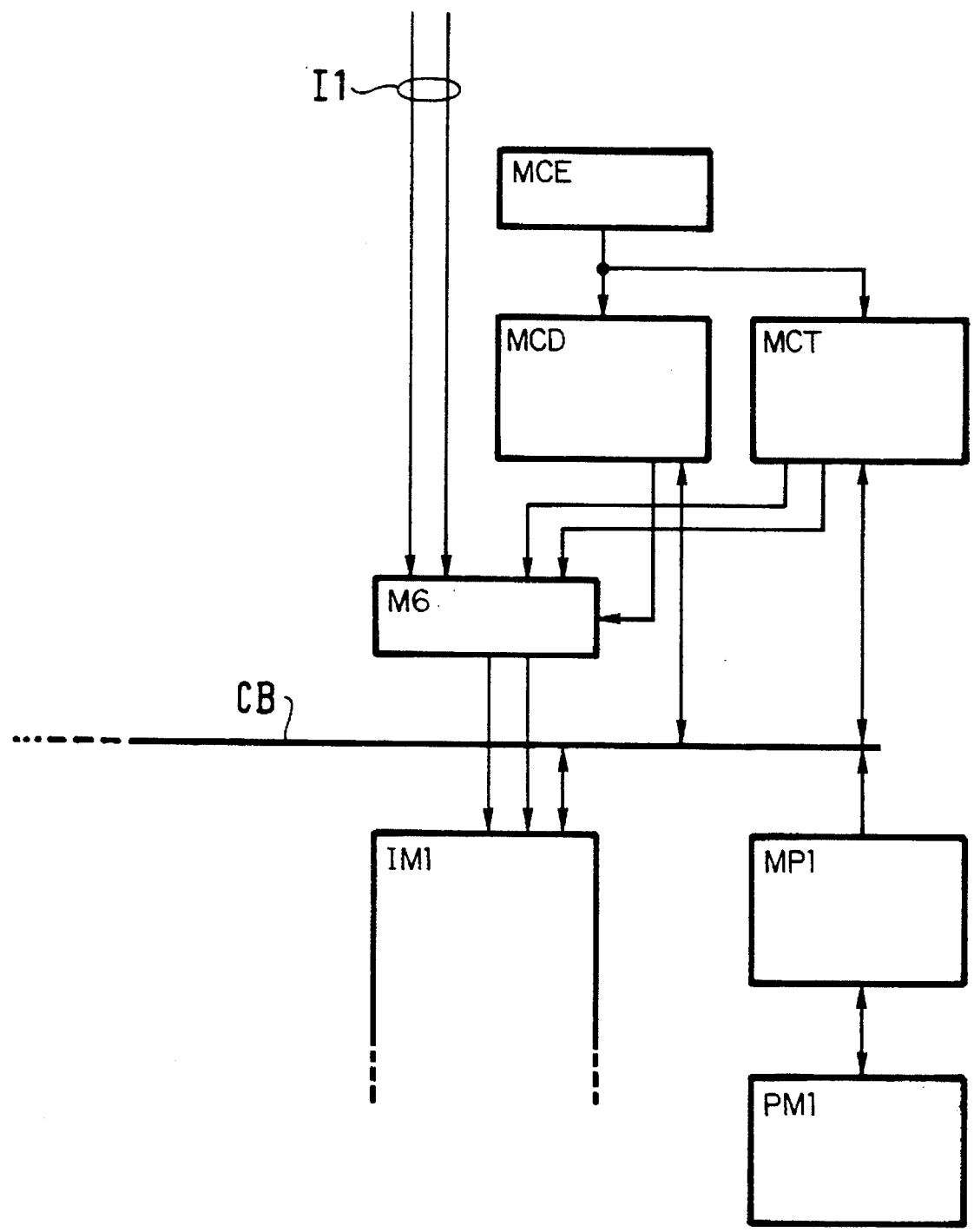
FIG. 8 shows the block diagram of means to be added to a cell assembly device of the invention to facilitate synchronous channel continuity testing.

FIG. 8 shows the block diagram of the means to be added to a cell assembly device such as the embodiment CD1 of this device shown in FIG. 4. These additional means are interleaved between the input I1 and the input memory IM1. They comprise:

a memory MCT containing 2 048 test words, previously loaded by the microprocessor MP1;

a counter MCE incremented by a clock at the timing rate of the incoming samples at the input I1;

a memory MCD containing 2 048×1 bits which are predetermined by the microprocessor MP1 and then loaded by the latter into this memory;

a multiplexer M6 having: an input connected to the input I1 to receive the two synchronous multiplex links; an input connected to an output of the memory MCT to receive two continuity test octets; a control input connected to an output of the memory MCD; and an output connected to the data input of the memory IM1, this input being no longer connected to the input I1.

The memories MCD and MCT are connected to the microprocessor MP1 by the bus CB. The counter MCE supplies an address which identifies the two time slots in which the two test octets will be transmitted. This address is used to read the test word in the memory MCT and to read a control bit of the multiplexer M6 in the memory MCD. According to the value of this bit, the multiplexer M6 transmits two octets representing two samples of the incoming synchronous multiplex links at the input I1 or transmits the two continuity test octets supplied by the memory MCT.

Figure 9:
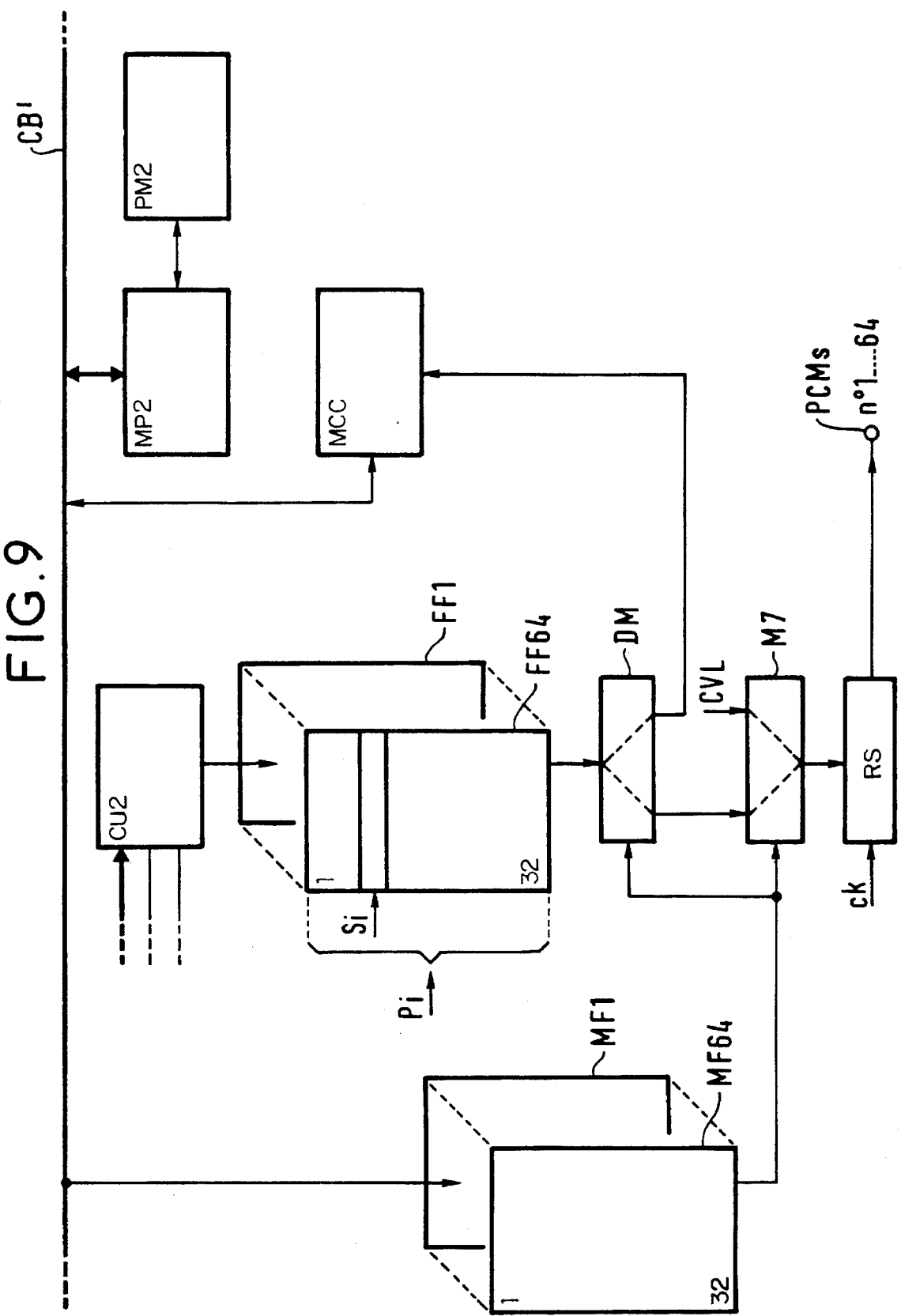
FIG. 9 shows the block diagram of additional means to be added to a cell disassembly device of the invention to carry out a continuity test; these additional means are also used to rearrange the synchronous channels in the cells.

FIG. 9 shows the block diagram of means for adding to a cell assembly device such as the embodiment DD1 of this device shown in FIG. 6 to enable synchronous channel continuity testing and rearrangement of the synchronous channels in the cells. The control unit CU2 and the components not shown in FIG. 9 are unchanged. The means to be added comprise:

a demultiplexer DM with one data input and two data outputs; the data input is connected to the data output of the frame formation memories FF1, . . . , FF64;

a device MCC for verifying test octets essentially comprising a memory analogous to the memory MCT and containing the expected test octets and a comparator logic circuit; this device has an input-output connected to the bus CB via an interface (not shown) and an input connected to a first output of the demultiplexer DM;

a multiplexer M7 with two inputs and one output having a first input connected to the second output of the demultiplexer DM and a second input receiving a fixed octet CVL which is a code word indicating that the channel carrying this code word is free;

a set RS of output registers for forming a frame for each of the 64 synchronous multiplexers PCMs n° 1, ..., 64 outgoing from the cell disassembly device; the register set RS has: a data input connected to the output of the multiplexer M7; an output connected to the synchronous multiplex links PCMs n° 1, ..., 64; and a write clock input receiving a periodic clock signal CK at the timing rate of the octets to write to reconstruct a frame of 32 octets;

64 frame formation marking memories MF1, ..., MF64 respectively corresponding to the 64 output synchronous multiplex links PCMs n° 1, ..., 64; having a control input connected to the bus CB' by an interface (not shown) and a data output connected to a control input of the multiplexer M7 and to a control input of the demultiplexer DM.

The 64 memories MF1, ..., MF64 respectively correspond to the 64 frames each of 32 octets to be transmitted periodically. They contain for each synchronous channel a binary word indicating the status of the channel: channel idle; or channel undergoing continuity check; or channel active.

This binary word determines the identity of the data to constitute the synchronous frames at the output of the cell disassembly device: a test octet, or an octet representing a signal sample, or a code octet indicating that the channel is free. They are read sequentially at the timing rate of the samples output on the synchronous multiplex links by means (not shown) also supplying a read address to the frame formation memories FF1, ..., FF64. The content of the memories MF1, ..., MF64 is written into these memories by the microprocessor MP2.

When the channel is idle the multiplexer M7 is commanded to transmit the code word CVL. When the channel is undergoing the continuity test the demultiplexer DM is commanded to transmit the octets received to the continuity verification device MCC. At the same time the multiplexer M7 is commanded to transmit the code word CVL indicating that the downstream channel is free. When the channel is active the demultiplexer DM and the multiplexer M7 are commanded to transmit to the register set RS the respective octets read in the frame formation memories FF1, ..., FF64.

The additional means shown in FIG. 9 are also used to rearrange the synchronous channels in the cells, by transferring a synchronous channel from a first asynchronous transfer mode logical channel to a second asynchronous transfer mode logical channel if the cells conveying the first channel are virtually empty so that synchronous channel transmission and switching are inefficient. The cell assembly device, such as the embodiment CD1 of this device shown in FIG. 4, contributes to the rearrangement operation, but does not require any additional means except additional functions for the software of the microprocessor MP1: it determines which synchronous channels are to be rearranged, i.e. the synchronous channels for which a first connection has been set up but which is being conveyed by insufficiently full cells at the time in question.

It then sets up a second connection for each of these synchronous channels. When this second connection has been set up and validated by a continuity test the microprocessor MP2 of the cell disassembly device decides to release the first connection in favor of the second. The frame formation memories FF1, ..., FF64 therefore contain at a given time two octets representing the same sample of the channel being rearranged, but only one of these octets is transferred to the register set RS. As soon as the new connection is validated the marking which determines the read address in the memories FF1, ..., FF6 is modified in the marking memory MM1 and in the frame formation marking memories MF1, ..., MF64 in order to read in the memories FF1, ..., FF64 and then write into the register set RS the octet corresponding to the new connection.

To set up the new connection the microprocessor MP1 of the cell disassembly device CD1 inserts a new binary word N into the marking memory MM and the microprocessor MP2 of the cell disassembly device DD1 inserts the same word N into the marking memory MM'.

The words contained in the memories MM and MM' are chained. Each word $M_i$ is called by a word $M_{i-1}$ and calls a word $M_{i+1}$ or terminates a page.

If a new word N has to be inserted between two words $M_i$ and $M_{i+1}$, each microprocessor commands:

the writing of the word N calling $M_{i+1}$ at a free address;

the writing of the word $M_i$ calling the word N, rather than $M_{i+1}$, at the previous address of the word $M_i$ calling $M_{i+1}$.

The microprocessor MP2 in the device DD1 then commands writing into the memories FF1, ..., FF64 of a code word indicating that the channel is active.

When a connection is released the microprocessors MP1 and MP2 command removal of a word Mj from the marking memories MM and MM', respectively. If this word Mj must be removed between two words $M_{j-1}$ and $M_{j+1}$, each microprocessor commands the writing of the word $M_{j-1}$ calling Mj rather than $M_{j+1}$ at the previous address of the word $M_{j-1}$. Also, the microprocessor MP2 in the device DD1 commands writing into the memories FF1, ..., FF64 of a code word indicating that the channel is free.

Figure 10:
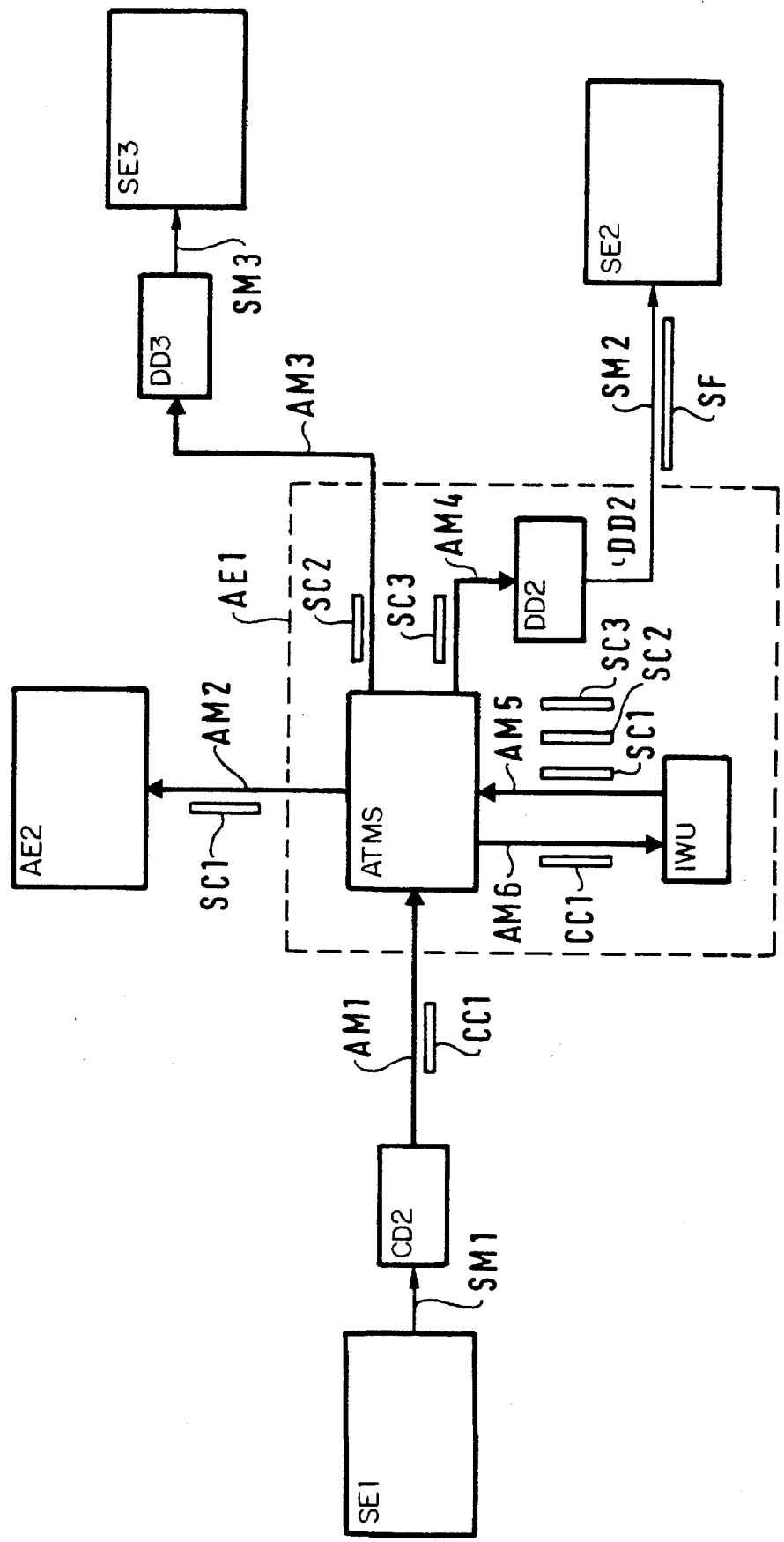
FIG. 10 shows the block diagram of one embodiment of the asynchronous digital channel switching center of the invention.

FIG. 10 shows the block diagram of an asynchronous switching center AE1 and its connections to three synchronous switching centers SE1, SE2, SE3 and to another asynchronous switching center AE2, for one example of transmission. To simplify the figure only the means required for one transmission direction are shown.

Figure 11:
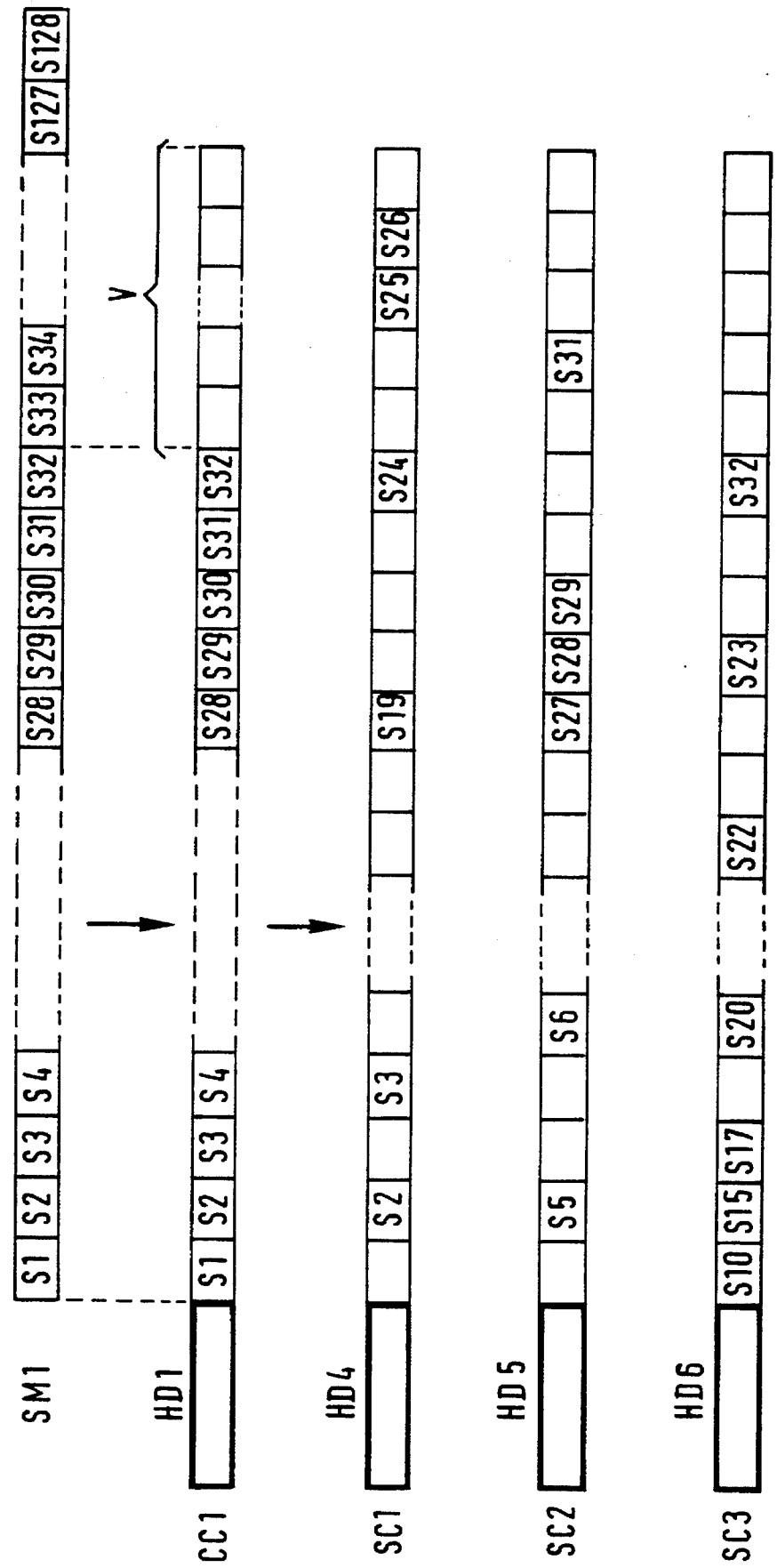
FIG. 11 illustrates the operation of this embodiment of the invention.

FIG. 11 shows the operation of the center and shows in diagrammatic form:

the content of one frame of a synchronous multiplex link SM1 which is to be transmitted from the synchronous switching center SE1 to a plurality of destinations in the form of the switching centers SE2, SE3 and AE2;

a composite cell CC1 obtained by cell assembly of this frame of the synchronous multiplex link SM1, the remainder of this frame being transmitted in other composite cells that are not shown; and three cells SC1, SC2, SC3 which are obtained by breaking up the composite cell CC1.

The synchronous switching center SE1 transmits a frame S1, S2, ..., S128 on the synchronous multiplex link SM1, but this frame is in fact routed in the form of a stream of composite cells to the switching center AE1, by a cell assembly device CD2 near the synchronous switching center SE1. The device CD2 is described below. The asynchronous switching center AE1 is connected to another asynchronous switching center AE2 by an asynchronous multiplex link AM2. It is connected to a synchronous switching center SE3 by an asynchronous multiplex link AM3 using a cell disassembly device DD3 near the switching center SE3 and connected to it by a synchronous multiplex link SM3.

The asynchronous switching center AE1 is also connected to a synchronous switching center SE2 by a synchronous multiplex link SM2, for which purpose the switching center AE1 includes a cell disassembly device DD2. The switching center AE1 includes a conventional asynchronous transfer mode switching network ATMS associated with the cell disassembly device DD2 and with an interworking unit IWU. The switching network ATMS is connected directly to the asynchronous multiplex links AM1, AM2, AM3. It is connected to the cell disassembly device DD2 by an asynchronous multiplex link AM4 and to the interworking unit IWU by a multiplex link AM5 incoming into the switching network ATMS via an asynchronous multiplex link AM6 outgoing from the switching network ATMS.

In the example shown in FIG. 10 the switching center SE1 sends on the synchronous multiplex link SM1 a frame S1, . . . , S128 which is partially addressed to three destinations in the form of the switching centers AE2, SE3, SE2, the switching center AE1 serving only as a transit switching center. The cell assembly device CD2 at the output of the switching center SE1 forms this frame into four composite cells. Only the first composite cell CC1 is shown in FIG. 10.

The cells used for the transmission are preferably fixed length cells but the person skilled in the art knows how to use variable length cells, substituting cell assembly and disassembly devices for variable length cells for the devices CD2, DD2 and DD3.

FIG. 11 shows the conversion of the frame S1, . . . , S128, showing by way of example samples of 128 respective synchronous channels. These synchronous channels can be supported by the same logical channel connecting the synchronous switching center SE1 to the asynchronous switching center AE1. These 128 octets are conveyed by four successive fixed length cells having identical headers. Only the first of these cells, i.e. the cell CC1, is shown in FIG. 11. It has a header HD1. Each cell conveys 32 successive octets and has 12 empty octets at the end of the cell.

For example, the composite cell CC1 conveys 32 octets S1, . . . , S32 respectively representing one sample of the first 32 synchronous channels by means of the synchronous multiplex link SM1. When the cell CC1 reaches the asynchronous switching center AE1 these octets can no longer be conveyed by the same logical channel as they have to be separated to be routed to the switching centers AE2, SE3 and SE2, as appropriate. The composite cell CC1 is then converted into three cells SC1, SC2, SC3 corresponding to respective logical channels routed to the switching centers AE2, SE3, SE2.

For example, the octets S2, S3, . . . , S19, S24, S25, S26 addressed to the switching center AE2 are placed in a cell SC1 including a header HD4 designating a logical channel connecting the switching center AE1 to the switching center AE2, for example. The octets S5, S6, . . . , S27, S28, S29, S31 addressed to the switching center SE3 are placed in a cell SC2 having a header HD5 designating a logical channel connecting the switching center AE1 to the switching center SE3. The octets S10, S15, S17, S20, S22, S23, S32 addressed to the switching center SE2 are placed in a cell SC3 having a header HD6 designating a logical channel connecting the switching center AE1 to the switching center SE2.

An alternative embodiment entails putting three successive frames into two successive cells, since 96 octets is exactly the amount of room required for the 2×48 payload octets of two cells.

The composite cell CC1 is routed in the switching network ATMS to the multiplex link AM6 in order to transmit it to the interworking unit IWU. The unit IWU outputs three cells SC1, SC2, SC3 on the asynchronous multiplex link AM5. These three cells include respective octets whose destinations are the asynchronous switching center AE2, the synchronous switching center SE3 and the synchronous switching center SE2.

These are still composite cells, but they usually convey fewer synchronous channels than the composite cell CC1. Each includes in its header a virtual circuit group identifier and a virtual circuit identifier. The headers of the three cells SC1, SC2, SC3 identify three different logical channels respectively corresponding to the three destinations.

The connection network ATMS then routes these cells to their respective destinations. The cell SC3 does not leave the switching center AE1. It is converted to the form of a synchronous frame SF by the cell disassembly device DD2 to be routed over the synchronous multiplex link SM2 to the switching center SE2. The cells SC1 and SC2 do leave the switching center AE1, however, and are transmitted to their respective destinations. The cell SC2 is converted into an asynchronous multiplex link SM3 frame when it approaches the synchronous switching center SE3 by the cell disassembly device DD3.

The interworking device IWU is a prior art device already used as a gateway between a synchronous channel telecommunication network and an asynchronous channel telecommunication network. It is described in French patent application FR-A-2 655 794, for example. In the application described above there is a single interworking device IWU to enable transmission of synchronous channels from a synchronous switching center SE1 to a plurality of synchronous or asynchronous switching centers, whereas conventionally a gateway including an interworking device is needed for each pair comprising an asynchronous switching center and a synchronous switching center which have to communicate with each other. It is therefore clear that the use of cell assembly and cell disassembly devices of the invention enables interworking of a greater number of switching centers for a given number of interworking devices.

Figure 12:
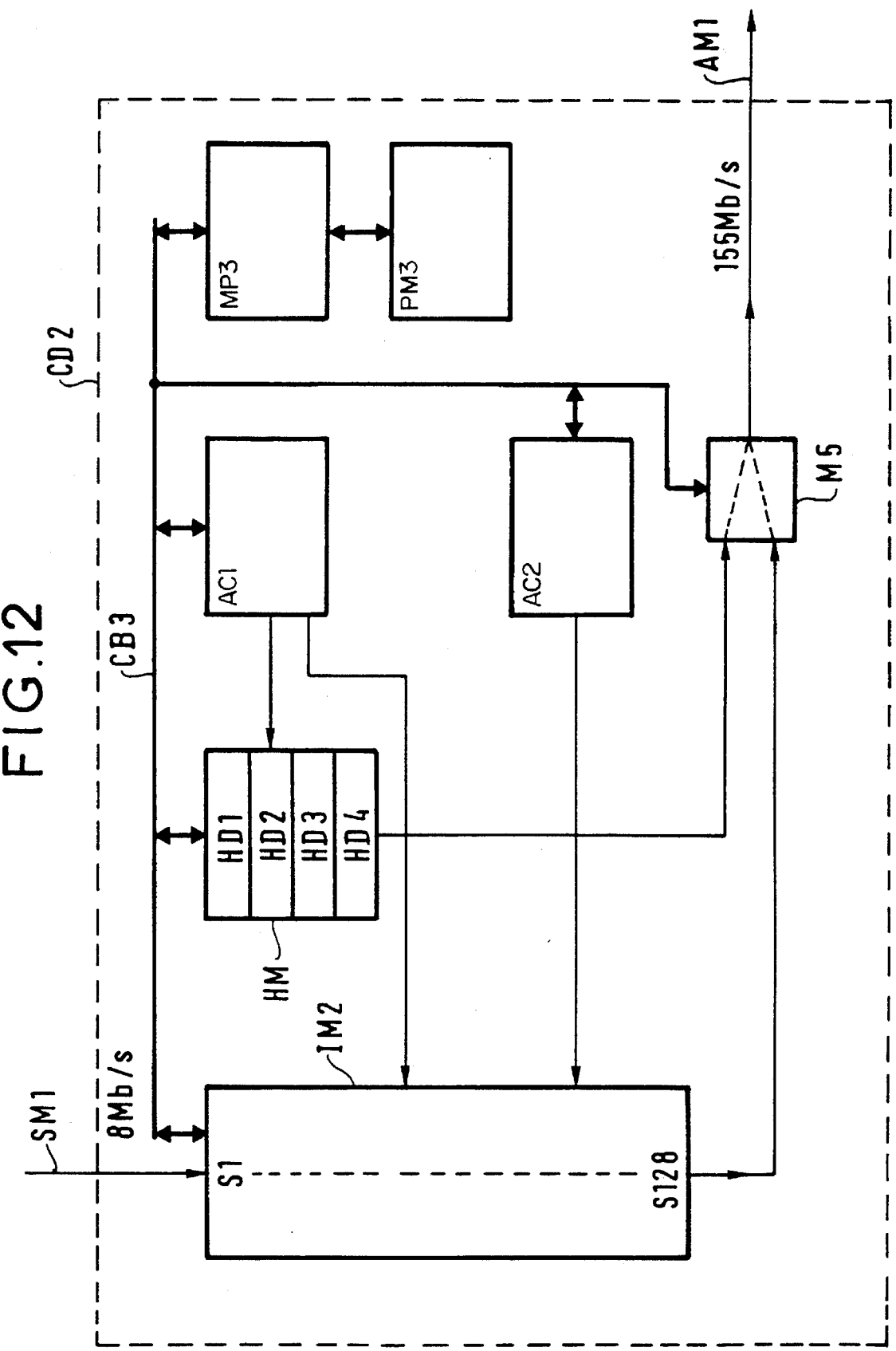
FIG. 12 shows a block diagram of a second embodiment of the cell assembly device of the invention, to be used in the switching center shown in FIG. 10.

FIG. 12 shows the block diagram of a second embodiment CD2 of the cell assembly device of the invention. This embodiment of the invention is more particularly intended for receiving the synchronous multiplex SM1 and transmitting the asynchronous multiplex AM1 mentioned with reference to FIG. 10. It therefore receives 128 octets S1, . . . , S128 in each period of 125 microseconds.

It includes:

an input memory IM2 having a capacity of 128 octets and of the first in/first out type;

a read addressing circuit AC1;

a write addressing circuit AC2;

a memory HM for storing four headers HD1, . . . , HD4 each comprising five octets;

a microprocessor MP3 associated with a program memory PM3 and connected to a control bus CB3;

a multiplexer M5 having two data inputs and one output and a control input connected to the bus CB3 by an interface that is not shown.

The microprocessor MP3 and the program memory PM3 constitute a sequencer controlling the memories IM2, HM, the addressing circuits AC1, AC2 and the multiplexer M5 via the control bus CB3. The write addressing circuit AC2 supplies write addresses for writing 128 data octets successively into the memory IM2 during each frame period of the synchronous multiplex link SM1. To constitute a first composite cell SC1 the read addressing circuit AC1 first supplies five successive addresses to the memory HM to read the five octets constituting the header HD1 of the cell CC1 and then 32 successive addresses to the memory IM2 to read the first 32 octets of the frame stored in this memory. These read operations are carried out at the bit rate of 155.52 Mbit/s.

A first input of the multiplexer M5 is connected to an output of the memory HM. A second input of the multiplexer M5 is connected to an output of the memory IM2. The output of the multiplexer M5 constitutes the output of the cell assembly device CD2. During a first phase the multiplexer M5 is commanded by the microprocessor MP3 to transmit the header supplied by the memory HM. During a second phase it is then commanded to transmit the payload octets supplied by the memory IM2. The same sequence of operations is repeated thereafter to transmit the composite cells CC2, CC3 and CC4 for transmitting all the 128 octets of a frame of the multiplex link SM1.

Figure 13:
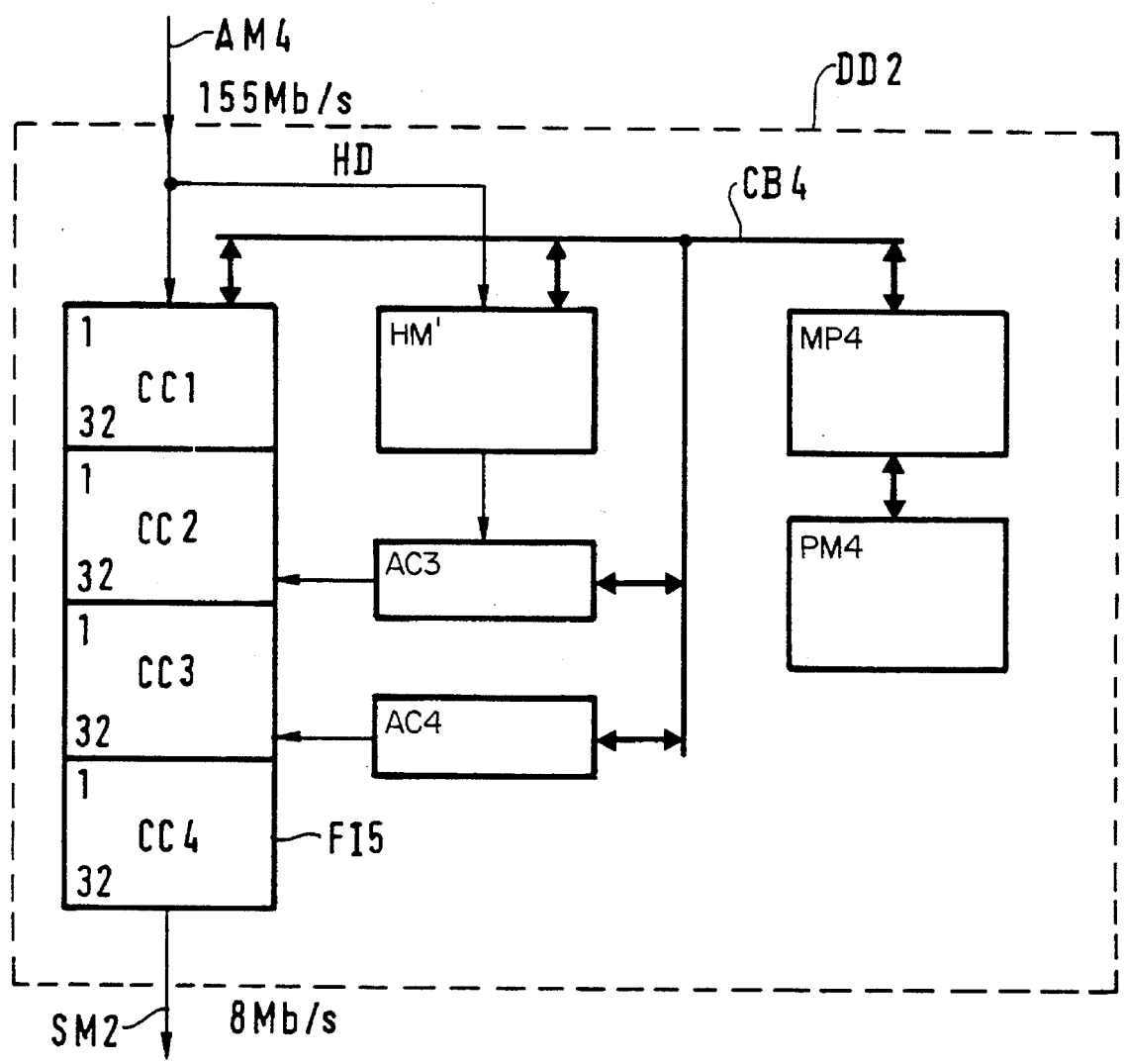
FIG. 13 shows the block diagram of a second embodiment of the cell disassembly device of the invention.

FIG. 13 shows the block diagram of a second embodiment DD2 of the cell disassembly device of the invention, which is more particularly adapted to be used in the asynchronous switching center AE1 shown in FIG. 10. It receives on one input the 155.52 Mbit/s asynchronous multiplex link AM4 and outputs a 8.192 Mbit/s synchronous multiplex link SM2 organized in frames of 128 octets. It includes:

a memory FI5 having the capacity needed to store four packets each of 32 octets, these being the data octets conveyed by the four cells CC1, CC2, CC3, CC4;

a content-addressable memory HM' for recognizing each of the four headers HD1, HD2, HD3, HD4;

a write addressing circuit AC3;

a read addressing circuit AC4;

a microprocessor MP4 and an associated program memory PM4, the former connected to a control bus CB4 to constitute a sequencer controlling the operation of the cell disassembly device DD2 as a whole.

The microprocessor MP4 controls the memories FI5, HM' and the addressing circuits AC3 and AC4 via the bus CB4.

The memory FI5 has a data input connected to the asynchronous multiplex link AM4 to receive the payload of the cells. In this example each cell payload systematically includes 32 data octets and 16 empty octets. The empty octets are not written into the memory FI5. The memory HM' has a data input connected to the multiplex link AM4 to detect the arrival of one of the expected headers. This input enables comparison with each of the four headers expected. An output of the memory HM' supplies a binary word indicating detection of one of these headers. This output is connected to a control input of the addressing circuit AC3 to command it to start supplying a series of 32 addresses, starting from the address corresponding to the header that has been detected. This series of addresses is applied to a write address input of the memory FI5 to write into this memory the 32 octets of the payload of the cell whose header has been detected. This write operation is effected at the bit rate of 155.52 Mbit/s.

The read addressing circuit AC4 supplies a series of 128 addresses to a read address input of the memory FI5 at the bit rate of 8.192 Mbit/s to read the 128 payload octets of the composite cells CC1, CC2, CC3, CC4 and so constitute a frame of the synchronous multiplex link SM2.

We claim:

1. A cell assembly device for switching and assembling synchronous digital channels into asynchronous transfer mode cells supporting asynchronous logical channels, said cells being sent on asynchronous multiplex links, said synchronous digital channels being conveyed by synchronous multiplex links organized into recurrent frames with a fixed frame period, and said frames being divided into time slots of fixed duration, samples of each synchronous digital channel being represented by binary words placed in time slots occupying a fixed position in the frame; said cell assembly device comprising:

an input memory for storing the samples of all the synchronous digital channels of each frame as the samples are received by said cell assembly device;

cell formation memories being read sequentially for respectively supplying cells to said asynchronous multiplex links;

a cell identifier memory for storing, for each cell, at least: a cell header assigned to the cell; a word indicating on which asynchronous multiplex link the cell must be transmitted; an initial read address; and a write address;

a marking memory containing marking information relative to the switching of the synchronous digital channels to the asynchronous logical channels, the marking information being in the form of a link list, said marking memory being read at the initial read address supplied by the cell identifier memory to supply a next address to read in said marking memory and in one of said cell formation memories, and to supply a next address to read in the input memory, said marking memory having an number of pages equal to a maximal number of cells that can be transmitted during a frame period, each page respectively corresponding to payload octets of a cell; and a control circuit for transmitting octets from the input memory into one of said cell formation memories, and for transmitting a header from the cell identifier memory into one of said cell formation memories, at write addresses supplied by the cell identifier memory.

2. The cell assembly device according to claim 1, for switching and assembling synchronous digital channels into fixed length cells, wherein said control circuit transmits, for constituting each cell in the cell formation memories, a fixed number of octets from the input memory into the cell formation memories.

3. A switching center for switching asynchronous digital channels for routing to other switching centers, cells produced by the cell assembly device according to claim 2, said cells thus conveying binary words representing respective channels of a plurality of different asynchronous channels, said switching center comprising:

an asynchronous transfer mode switching network (ATMS) having a plurality of ports for asynchronous digital channels;

means for receiving cells conveying binary words representing respective channels of a plurality of different synchronous channels, said means for receiving being connected to one of said ports;

means for extracting from said cells the binary words that said cells convey; and means for placing in a plurality of separate cells conveying separate logical channels the extracted binary words representing respective samples of different synchronous channels which may not be conveyed by the same logical channel.

4. The cell assembly device according to claim 1, for switching and assembling synchronous digital channels into variable length cells, wherein each cell header stored in the cell identifier memory comprises a self-routing tag;

and wherein said control circuit transmits, from the input memory into one of said cell formation memories, for constituting each cell, only a number of octets corresponding to a number of synchronous channels that can be conveyed by an asynchronous logical channel supported by said cell; cells being stored end to end in the cell formation memories.

5. A switching center for switching asynchronous digital channels for routing to other switching centers, cells produced by the cell assembly device according to claim 4, said cells thus conveying binary words representing respective channels of a plurality of different asynchronous channels, said switching center comprising:

- an asynchronous transfer mode switching network (ATMS) having a plurality of ports for asynchronous digital channels;
- means for receiving cells conveying binary words representing respective channels of a plurality of different synchronous channels, said means for receiving being connected to one of said ports;
- means for extracting from said cells the binary words that said cells convey; and
- means for placing in a plurality of separate cells conveying separate logical channels the extracted binary words representing respective samples of different synchronous channels which may not be conveyed by the same logical channel.

6. A switching center for switching asynchronous digital channels for routing to other switching centers, cells produced by the cell assembly device according to claim 1, said cells thus conveying binary words representing respective channels of a plurality of different asynchronous channels, said switching center comprising:

- an asynchronous transfer mode switching network (ATMS) having a plurality of ports for asynchronous digital channels;
- means for receiving cells conveying binary words representing respective channels of a plurality of different synchronous channels, said means for receiving being connected to one of said ports;
- means for extracting from said cells the binary words that said cells convey; and
- means for placing in a plurality of separate cells conveying separate logical channels the extracted binary words representing respective samples of different synchronous channels which may not be conveyed by the same logical channel.

7. A cell disassembly device for disassembling and switching synchronous digital channels placed in asynchronous transfer mode cells supporting asynchronous logical channels and being transported by asynchronous multiplex links, each cell conveying a series of binary words each representing one sample of a synchronous channel, and for placing said binary words into synchronous frames transported by synchronous multiplex links, said device comprising:

- an input memory for storing all cells received from said asynchronous multiplex links;
- means for verifying an identity of each received cell, and deducing a write address from said identity if the received cell is expected, or eliminating the received cell if the received cell has been received because of an error;
- frame formation memories, respectively supplying frames to said synchronous multiplex links, when being read sequentially;
- a cell identifier memory for storing, for each received cell, at said write address supplied by the means for verifying the identity, at least: a page address corresponding to the received cell; and an initial line address within a page;
- a marking memory containing marking information relative to the switching of the synchronous channels to the synchronous frames, the marking information being in the form of a link list, said marking memory being read at an initial line address supplied by the cell identifier memory, and then at a line address supplied by itself, said marking memory supplying a write address; and
- control means for reading each octet of a cell payload in the input memory, in the order of cell arrival, and then writing each octet in a frame formation memory at a write address supplied by the marking memory.

8. The cell disassembly device according to claim 7 for disassembling and switching synchronous digital channels placed in fixed length cells, each cell comprising a virtual circuit group identifier and a virtual circuit identifier; wherein said means for verifying the identity of each cell samples the virtual circuit group identifier and the virtual circuit identifier of each received cell, and determines a write address from said virtual circuit group identifier and said virtual circuit identifier.

9. The cell disassembly device according to claim 7 for disassembling and switching synchronous digital channels placed in variable length cells, each cell comprising a self-routing tag and means for indicating a cell length;

- wherein said input memory comprises means for determining the end of each cell, and for memorizing cells end to end; and wherein said means for verifying the identity of each received cell samples the self-routing tag of each cell, and determines a write address corresponding to said self-routing tag.

10. A switching center for switching synchronous digital channels conveyed by synchronous multiplex links organized into recurrent frames having a fixed frame period and divided into time slots having fixed durations, samples of each channel being represented by a binary word placed in time slots occupying a fixed position in the frame, said switching center comprising:

- access units for incoming synchronous multiplex links including a cell assembly device for switching and assembling said synchronous digital channels into asynchronous transfer mode cells supporting asynchronous logical channels, said cells being sent on asynchronous multiplex links, said cell assembly device including: an input memory for storing the samples of all the synchronous digital channels of each frame as the samples are received by said cell assembly device; cell formation memories being read sequentially for respectively supplying cells to the asynchronous multiplex links; a cell identifier memory for storing, for each cell, at least: a cell header assigned to the cell, a word indicating on which of said asynchronous multiplex links the cell must be transmitted, an initial read address and a write address; a marking memory containing marking information related to switching of the synchronous digital channels to the asynchronous logical channels, the marking information being in the form of a link list, said marking memory being read at the initial read address supplied by the cell identifier memory to supply a next address to read in said marking memory and in one of said cell formation memories, and to supply a next address to read in the input memory, said marking memory having an number of pages equal to a maximal number of cells that can be transmitted during a frame period, each page respectively corresponding to payload octets of a cell; and a control circuit for transmitting octets from the input memory into one of said cell formation memories, and for transmitting a header from the cell identifier memory into one of said cell formation memories, at write addresses supplied by the cell identifier memory;

access units for outgoing synchronous multiplex links each including a cell disassembly device for disassembling and switching the synchronous digital channels placed in the asynchronous transfer mode cells and for placing said binary words into synchronous frames transported by synchronous multiplex links, said cell disassembling device comprising: an input memory for storing all cells received from said asynchronous multiplex links; means for verifying an identity of each received cell, and for deducing a write address from said identity if the received cell is expected, or eliminating the received cell if the received cell has been received because of an error; frame formation memories, respectively supplying frames to said synchronous multiplex links, when being read sequentially; a cell identifier memory for storing, for each received cell at said write address supplied by the means for verifying the identity, at least: a page address corresponding to the received cell, and an initial line address within a page; a marking memory containing marking information relative to the switching of the synchronous channels to the synchronous frames, the marking information being in the form of a link list, said marking memory being read at an initial line address supplied by the cell identifier memory, and then at a line address supplied by itself, said marking memory supplying a write address; and control means for reading each octet of a cell payload in the input memory, in the order of cell arrival, and then writing each octet in a frame formation memory at a write address supplied by the marking memory; and an asynchronous transfer mode switching network (ACN) setting up connections between the access units for incoming synchronous multiplex links and the access units for outgoing synchronous multiplex links to route fixed or variable length cells supplied by the access units for incoming synchronous multiplex links.

\* \* \* \* \*